United States Patent
Bidram et al.

(10) Patent No.: US 10,745,219 B2
(45) Date of Patent: Aug. 18, 2020

(54) MANIPULATOR APPARATUS, METHODS, AND SYSTEMS WITH AT LEAST ONE CABLE

(71) Applicant: ADVANCED INTELLIGENT SYSTEMS INC., Burnaby (CA)

(72) Inventors: Farhang Bidram, West Vancouver (CA); Mohammadreza Yavari, Burnaby (CA); Vahid Mehrabi, Coquitlam (CA); Amirmasoud Ghasemi Toudeshki, Coquitlam (CA); Seyed Mehdi Mirsadeghi, Coquitlam (CA); Thomas Julian Havens, Vancouver (CA)

(73) Assignee: Advanced Intelligent Systems Inc., Burnaby, British Columbia (CA)

( * ) Notice: Subject to any disclaimer, the term of this patent is extended or adjusted under 35 U.S.C. 154(b) by 0 days.

(21) Appl. No.: 16/510,795

(22) Filed: Jul. 12, 2019

(65) Prior Publication Data
US 2020/0102164 A1    Apr. 2, 2020

Related U.S. Application Data

(60) Provisional application No. 62/815,940, filed on Mar. 8, 2019, provisional application No. 62/768,860, filed
(Continued)

(51) Int. Cl.
*B65G 67/04* (2006.01)
*B65G 67/24* (2006.01)
(Continued)

(52) U.S. Cl.
CPC .............. *B65G 67/04* (2013.01); *B25J 5/007* (2013.01); *B25J 11/008* (2013.01); *B25J 13/085* (2013.01);
(Continued)

(58) Field of Classification Search
CPC ........... B25J 9/0078; B60P 1/483; B60P 1/50; B65G 67/04
See application file for complete search history.

(56) References Cited

U.S. PATENT DOCUMENTS

| 4,004,677 A | 1/1977 | Heier et al. |
| 4,536,690 A | 8/1985 | Belsterling et al. |

(Continued)

FOREIGN PATENT DOCUMENTS

| CA | 2622940 A1 | 3/2007 |
| CA | 3026002 A1 | 3/2018 |

(Continued)

OTHER PUBLICATIONS

International Search Report and Written Opinion of the International Searching Authority issued by the Canadian Intellectual Property Office in connection with International Patent Application No. PCT/CA2017/000057, dated Jul. 25, 2017, 14 pages.

(Continued)

*Primary Examiner* — Gerald McClain

(57) ABSTRACT

A manipulator apparatus for manipulating an article is disclosed. The apparatus includes an arm including a connecting end and a working end, an arm actuator coupled with the connecting end by an arm linkage, a lift actuator coupled with the connecting end, an end effector coupled with the working end by a rotatable connection, the end effector having an engagement orientation relative to the working end, and at least one cable coupled between the connecting end of the arm and the rotatable connection. The arm actuator is operable to cause the arm linkage to move the working end until the end effector engages an article in the engagement orientation; the lift actuator is operable to cause the connecting end to lift the working end, the end effector, and the article; and the cable is coupled to transmit move- (Continued)

ment of the connecting end to the rotatable connection to maintain the engagement orientation of the end effector.

16 Claims, 19 Drawing Sheets

Related U.S. Application Data on Nov. 17, 2018, provisional application No. 62/738,115, filed on Sep. 28, 2018.

(51) Int. Cl.
*B25J 5/00* (2006.01)
*B25J 13/08* (2006.01)
*B25J 11/00* (2006.01)
*B60P 1/48* (2006.01)
*B60P 1/50* (2006.01)

(52) U.S. Cl.
CPC ............ *B25J 13/086* (2013.01); *B65G 67/24* (2013.01); *B60P 1/483* (2013.01); *B60P 1/50* (2013.01); *B65G 2201/0235* (2013.01)

(56) References Cited

U.S. PATENT DOCUMENTS

| | | | |
|---|---|---|---|
| 4,600,355 A | 7/1986 | Johnson | |
| 4,621,562 A | 11/1986 | Carr et al. | |
| 4,636,137 A | 1/1987 | Lemelson | |
| 4,678,390 A | 7/1987 | Bonneton et al. | |
| 4,698,775 A | 10/1987 | Koch et al. | |
| 4,829,840 A | 5/1989 | Torii et al. | |
| 5,017,084 A | 5/1991 | Lemelson | |
| 5,358,568 A | 10/1994 | Okano et al. | |
| 5,491,540 A | 2/1996 | Hirst | |
| 5,503,513 A | 4/1996 | Detriche | |
| 5,523,662 A | 6/1996 | Goldenberg et al. | |
| 5,550,953 A | 8/1996 | Seraji | |
| 5,682,313 A | 10/1997 | Edlund et al. | |
| 5,710,870 A | 1/1998 | Ohm et al. | |
| 5,737,500 A | 4/1998 | Seraji et al. | |
| 5,787,322 A | 7/1998 | Sass et al. | |
| 5,809,375 A | 9/1998 | Owens, Jr. et al. | |
| 5,887,229 A | 3/1999 | Sass et al. | |
| 6,473,371 B1 | 10/2002 | White | |
| 6,507,163 B1 | 1/2003 | Allen | |
| 6,898,484 B2 | 5/2005 | Lemelson et al. | |
| 7,240,879 B1 | 7/2007 | Cepollina et al. | |
| 7,496,314 B2 | 2/2009 | Lombardo et al. | |
| 8,010,230 B2 | 8/2011 | Zini et al. | |
| 8,099,191 B2 | 1/2012 | Blanc et al. | |
| 8,160,747 B1 | 4/2012 | Blackwell et al. | |
| 8,229,595 B2 | 7/2012 | Seelinger et al. | |
| 8,229,622 B2 | 7/2012 | Payne et al. | |
| 8,360,178 B2 | 1/2013 | Goldenberg et al. | |
| 8,588,976 B2 | 11/2013 | Mangaser et al. | |
| 8,676,425 B2 | 3/2014 | Jones et al. | |
| 8,915,692 B2 | 12/2014 | Grinnell et al. | |
| 8,958,916 B2 | 2/2015 | Setrakian et al. | |
| 9,114,440 B1 | 8/2015 | Colucci et al. | |
| 9,238,304 B1 | 1/2016 | Bradski et al. | |
| 9,254,897 B2 | 2/2016 | Andrieu et al. | |
| 9,440,352 B2 | 9/2016 | Meier et al. | |
| 9,486,921 B1 | 11/2016 | Straszheim et al. | |
| 9,505,136 B1 | 11/2016 | Nusser et al. | |
| 9,751,693 B1 | 9/2017 | Battles et al. | |
| 9,770,825 B2 | 9/2017 | Goldenberg et al. | |
| 9,889,562 B1 | 2/2018 | Rembisz | |
| 9,902,560 B2 | 2/2018 | Porat | |
| 9,919,872 B2 | 3/2018 | Khodl et al. | |
| 9,952,589 B1 | 4/2018 | Brazeau | |
| 9,958,854 B2 | 5/2018 | Vasquez et al. | |
| 10,059,006 B2 | 8/2018 | Rublee | |
| 10,065,314 B2 | 9/2018 | Tian et al. | |
| 10,108,185 B1 | 10/2018 | Theobald | |
| 10,144,128 B1 | 12/2018 | Kolb et al. | |
| 10,214,400 B2 | 2/2019 | High et al. | |
| 10,336,592 B2 | 7/2019 | Atchley et al. | |
| 2004/0243280 A1 | 12/2004 | Bash et al. | |
| 2005/0222713 A1 | 10/2005 | Kawabe et al. | |
| 2008/0282494 A1 | 11/2008 | Won et al. | |
| 2009/0157224 A1 | 6/2009 | Blanc et al. | |
| 2011/0010007 A1 | 1/2011 | Sarh et al. | |
| 2011/0172850 A1 | 7/2011 | Paz-Meidan et al. | |
| 2011/0301757 A1 | 12/2011 | Jones et al. | |
| 2012/0029697 A1 | 2/2012 | Ota et al. | |
| 2013/0054024 A1 | 2/2013 | Bruemmer et al. | |
| 2013/0110281 A1 | 5/2013 | Jones et al. | |
| 2013/0181544 A1 | 7/2013 | Comins et al. | |
| 2014/0363264 A1 | 12/2014 | Gowa et al. | |
| 2015/0050111 A1 | 2/2015 | Townsend | |
| 2015/0066281 A1 | 3/2015 | Allen et al. | |
| 2015/0151933 A1 | 6/2015 | Grinnell et al. | |
| 2016/0075014 A1 | 3/2016 | Bruemmer | |
| 2016/0101940 A1 | 4/2016 | Grinnell et al. | |
| 2016/0176638 A1 | 6/2016 | Toebes | |
| 2016/0187886 A1 | 6/2016 | Jones et al. | |
| 2016/0257212 A1 | 9/2016 | Thompson et al. | |
| 2016/0259028 A1 | 9/2016 | High et al. | |
| 2016/0259341 A1 | 9/2016 | High et al. | |
| 2016/0259342 A1 | 9/2016 | High et al. | |
| 2016/0259343 A1 | 9/2016 | High et al. | |
| 2016/0259345 A1 | 9/2016 | McHale et al. | |
| 2016/0260054 A1 | 9/2016 | High et al. | |
| 2016/0260161 A1 | 9/2016 | Atchley et al. | |
| 2016/0261698 A1 | 9/2016 | Thompson et al. | |
| 2016/0318494 A1 | 11/2016 | Henry et al. | |
| 2016/0349758 A1 | 12/2016 | Wang et al. | |
| 2017/0009417 A1 | 1/2017 | High et al. | |
| 2017/0010608 A1 | 1/2017 | High et al. | |
| 2017/0010609 A1 | 1/2017 | High et al. | |
| 2017/0020354 A1 | 1/2017 | High et al. | |
| 2017/0024806 A1 | 1/2017 | High et al. | |
| 2017/0183159 A1 | 6/2017 | Weiss | |
| 2017/0248966 A1 | 8/2017 | Lutz et al. | |
| 2017/0283171 A1 | 10/2017 | High et al. | |
| 2017/0349376 A1 | 12/2017 | Porat | |
| 2018/0001479 A1 | 1/2018 | Li et al. | |
| 2018/0127999 A1 | 5/2018 | Durvasula et al. | |
| 2018/0162469 A1 | 6/2018 | Blankespoor et al. | |
| 2018/0281143 A1 | 10/2018 | Albert et al. | |
| 2018/0349843 A1 | 12/2018 | High et al. | |
| 2018/0354143 A1 | 12/2018 | Dorfman | |
| 2018/0361571 A1 | 12/2018 | Georgeson et al. | |
| 2019/0168394 A1* | 6/2019 | Bidram | ............... B25J 15/0206 |
| 2019/0248024 A1* | 8/2019 | Bidram | ............... G05D 1/0094 |

FOREIGN PATENT DOCUMENTS

| | | |
|---|---|---|
| CN | 1611331 A | 5/2005 |
| CN | 104133472 A | 11/2014 |
| CN | 205219095 | 5/2016 |
| CN | 105729441 A | 7/2016 |
| CN | 106002932 A | 10/2016 |
| CN | 106272415 A | 1/2017 |
| CN | 107753105 A A | 3/2018 |
| CN | 108335458 A | 7/2018 |
| DE | 3416435 A1 | 11/1985 |
| DE | 102015220066 A1 | 4/2017 |
| DE | 102016009548 B3 | 8/2017 |
| DE | 102016222255 B3 | 4/2018 |
| DE | 102017009939 A | 4/2019 |
| EP | 0304342 A2 | 2/1989 |
| EP | 0388288 A1 | 9/1990 |
| EP | 0441397 A1 | 8/1991 |
| EP | 0616275 B1 | 9/1998 |
| EP | 2147757 A1 | 1/2010 |
| EP | 2296071 A1 | 3/2011 |
| EP | 2631040 A2 | 8/2013 |
| EP | 2546711 B1 | 5/2018 |
| EP | 3415284 A2 | 12/2018 |
| EP | 3418245 A1 | 12/2018 |
| FR | 2492784 | 4/1982 |

(56) References Cited

FOREIGN PATENT DOCUMENTS

| | | | |
|---|---|---|---|
| JP | S6449237 A | 2/1989 | |
| JP | H04310382 A | 11/1992 | |
| JP | H05201547 A | 8/1993 | |
| JP | 3188953 B2 | 7/2001 | |
| JP | 2009196381 A | 9/2009 | |
| JP | 2016000432 A | 1/2016 | |
| JP | 2016000432 A | * | 1/2016 |
| JP | 5900462 B2 | 4/2016 | |
| JP | 6531968 B2 | 6/2019 | |
| KR | 20070011495 A | 1/2007 | |
| KR | 101038473 B1 | 6/2011 | |
| KR | 101059929 B1 | 8/2011 | |
| WO | 2004103864 A1 | 7/2006 | |
| WO | 2013066534 A1 | 5/2013 | |
| WO | 2015038705 A1 | 3/2015 | |
| WO | 2016161449 A1 | 10/2016 | |
| WO | WO 2016161449 | * | 10/2016 |
| WO | 2017197305 A1 | 11/2017 | |
| WO | 2018045448 A1 | 3/2018 | |
| WO | WO 2018045448 | * | 3/2018 |
| WO | 2018114041 A1 | 6/2018 | |
| WO | 2018140471 A1 | 8/2018 | |
| WO | 2018152268 A1 | 8/2018 | |
| WO | 2018162491 A1 | 9/2018 | |
| WO | 2018170102 A1 | 9/2018 | |
| WO | 2018205198 A1 | 11/2018 | |
| WO | 2018213164 A1 | 11/2018 | |
| WO | 2018213931 A1 | 11/2018 | |
| WO | 2019028226 A1 | 2/2019 | |
| WO | 2019055281 A3 | 3/2019 | |

OTHER PUBLICATIONS

International Search Report and Written Opinion of the International Searching Authority issued by the Canadian Intellectual Property Office in connection with International Patent Application No. PCT/CA2019/000022, dated May 3, 2019, 7 pages.

International Search Report and Written Opinion of the International Searching Authority issued by the Canadian Intellectual Property Office in connection with International Patent Application No. PCT/CA2019/050311, dated May 24 2019, 12 pages.

Kielhofer, Simon, European Patent Office, Extended European Search Report, in connection with related European Patent Application No. 17847836, dated Aug. 20, 2019, 8 pages.

International Search Report and Written Opinion of the International Searching Authority issued by the Canadian Intellectual Property Office in connection with International Patent Application No. PCT/CA2019/051390, dated Jan. 21, 2020, 9 pages.

* cited by examiner

FIG. 11A   FIG. 11B

MANIPULATOR APPARATUS, METHODS, AND SYSTEMS WITH AT LEAST ONE CABLE

RELATED APPLICATIONS

This application claims the benefit of: U.S. Provisional Patent Application No. 62/738,115, entitled "MANIPULATOR WITH ACTIVE GRIPPER ALIGNMENT," filed on Sep. 28, 2019; U.S. Provisional Patent Application No. 62/768,860, entitled "MANIPULATOR WITH SELF-ALIGNING GRIPPER," filed on Nov. 17, 2018; and U.S. Provisional Patent Application No. 62/815,940, entitled "MANIPULATOR WITH MECHANICAL SELF-ALIGNING GRIPPER," filed on Mar. 8, 2019, the entireties of which are hereby incorporated by reference.

BACKGROUND

Field

This disclosure relates generally to manipulator apparatus, methods, and systems. Particular aspects are operable with mobile robots configured to move articles.

Description of Related Art

Mobile robots may be configured to carry out a certain task autonomously or semi-autonomously for a variety of applications, such as the transportation and handling of articles. Some mobile robots may have a platform for storing the articles that may be utilized alongside human workers to potentially reduce the cost and time required to complete otherwise inefficient operations, such as performing labor, transportation, and maintenance tasks on the articles. In some of the above-referenced examples, the articles may be loaded to or unloaded from the platform using a manipulator apparatus. Further improvements are required to produce additional savings of cost and time.

SUMMARY

Various aspects of manipulator apparatus, methods, and systems are described. In accordance with one disclosed aspect there is provided a manipulator apparatus. The apparatus includes an arm including a connecting end and a working end. The apparatus also includes an arm actuator coupled with the connecting end by an arm linkage, a lift actuator coupled with the connecting end, and an end effector coupled with the working end by a rotatable connection, the end effector having an engagement orientation relative to the working end. The apparatus also includes at least one cable coupled between the connecting end of the arm and the rotatable connection. The arm actuator is operable to cause the arm linkage to move the working end until the end effector engages an article in the engagement orientation. The lift actuator is operable to cause the connecting end to lift the working end, the end effector, and the article. The cable is coupled to transmit movement of the connecting end to the rotatable connection to maintain the engagement orientation of the end effector while lifting such that an orientation of the article is maintained when being lifted.

The apparatus may include a rearward anchor approximate to the connecting end and a forward anchor approximate to the working end. The at least one cable may be engaged with the rearward and forward anchors so that a rotation of the rearward anchor causes an opposite rotation of the forward anchor.

The at least one cable may be enclosed within a housing that guides the at least one cable between the forward and rearward anchors. The at least one cable may move relative to the housing to transfer forces between the rearward and forward anchors.

The at least one cable may include a rearward cable that rotates the forward anchor and a forward cable that rotates the forward anchor.

The end effector may include opposing end effector segments, and the opposing end effector segments may be operable to engage the article.

The opposing end effector segments may be deflected apart from one another by the article when engaging the article in the engagement orientation.

The opposing end effector segments may exert a resilient retaining force to the article after being deflected apart.

The arm linkage may include a linear actuator operable to cause the working end to move relative to the connecting end.

The arm may be a first arm and the apparatus may further include a second arm including a second connecting end, a second working end, and a second end effector coupled with the second working end by a second rotatable connection. The arm linkage may maintain a parallel alignment of the working end with the second working end while moving the working end to cause the respective end effectors to engage the article. The first and second arms may be operable to engage the article from opposite sides for lifting the article.

The article may include a plant container (e.g., in which plants are being cultivated) and the end effector of the arm and the second end effector of the second arm may be operably configured to engage the plant container from opposing sides.

The arm linkage may include a parallelogram linkage that maintains the parallel alignment of the working end with the second working end.

The end effector may be linearly movable relative to the working end in a direction towards the second working end.

The end effector may include at least one motion operated sensor disposed to generate an engagement signal indicative of a state of engagement of the end effector.

The apparatus may include a controller operably configured to monitor the engagement signal and to produce an error signal when one of: the engagement signal indicates that the end effector is in the state of engagement prior to engaging or lifting the article, the engagement signal indicates that the end effector is not in the state of engagement while lifting the article, or the engagement signal changes state from indicating that the end effector is in the state of engagement to not being in the state of engagement while lifting the article.

The at least one motion operated sensor may include one of a limit switch, a proximity detector, a force sensor, or a strain gauge.

The engagement signal produced by the at least one motion operated sensor may include one of a signal having a first state indicative of the end effector being in the state of engagement and a second state indicative of the end effector is not in the state of engagement, or a signal having a plurality of values indicative of a degree of engagement of the end effector.

Other aspects and features will become apparent to those ordinarily skilled in the art upon review of the descriptions of in conjunction with the accompanying figures.

BRIEF DESCRIPTION OF THE DRAWINGS

The accompanying drawings illustrate exemplary aspects that, together with the written descriptions, serve to explain various aspects of this disclosure. For a more comprehensive understanding of the nature and advantages of this disclosure, as well as the preferred modes of use thereof, reference should be made to the descriptions read in conjunction with the accompanying drawings. With respect to the drawings:

FIG. 11A is a top-down view of the manipulator apparatus of FIG. 7 after positioning an exemplary article for engagement with the manipulator apparatus.

FIG. 11B is a top-down view of the manipulator apparatus of FIG. 7 after operating the manipulator apparatus to engage the article.

DETAILED DESCRIPTION

Figure 1:
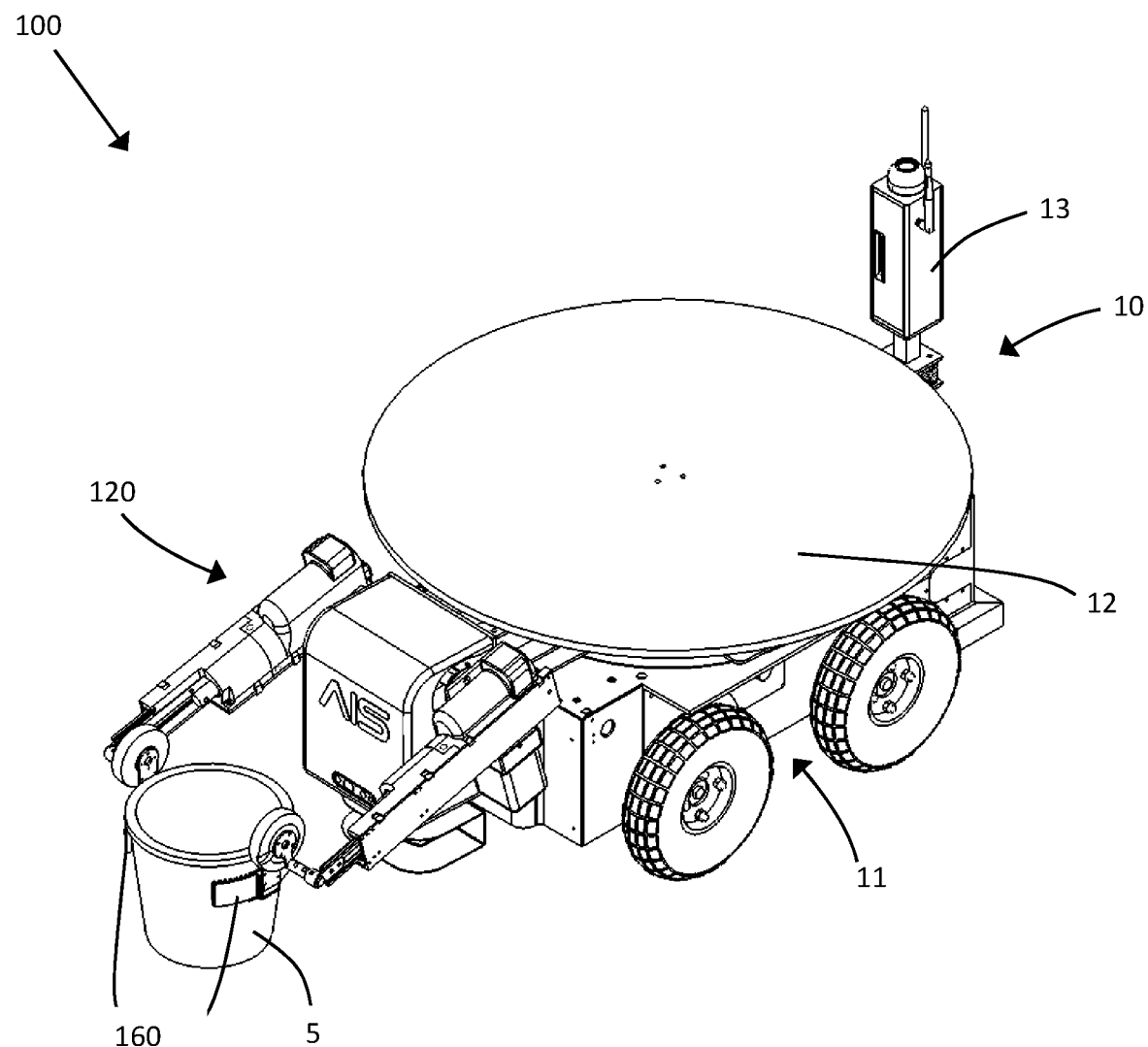
FIG. 1 is a perspective view of an exemplary system comprising an exemplary mobile robot and an exemplary manipulator apparatus.
Figure 2:
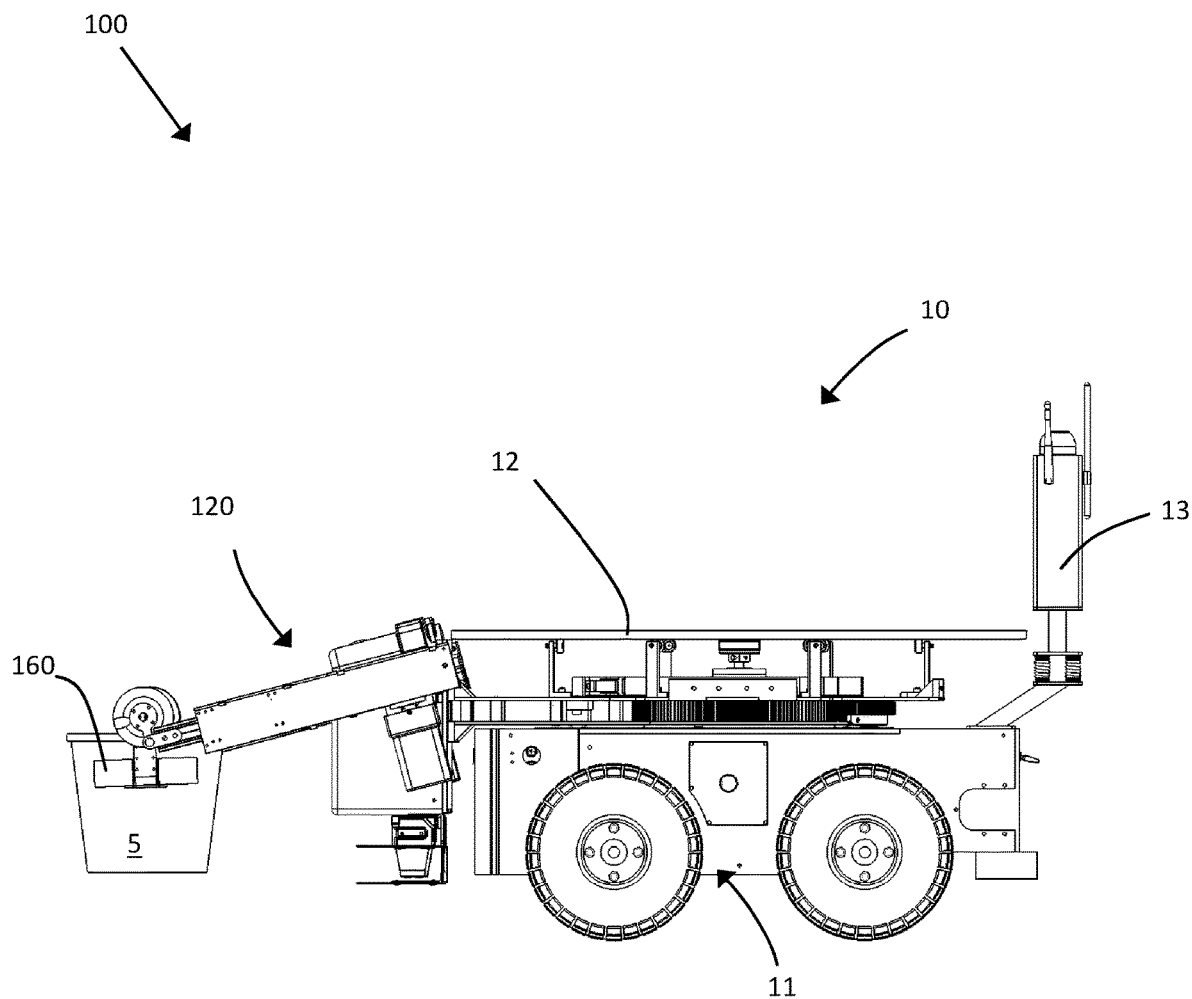
FIG. 2 is a side view of the system of FIG. 1.

Aspects of this disclosure are described with reference to an exemplary manipulator system 100. Referring to FIG. 1 and FIG. 2, system 100 may comprise a mobile robot 10 operable to manipulate an article 5. Mobile robot 10 may comprise a wheeled chassis 11, a table platform 12, a controller 13, and a manipulator 120. Each of wheeled chassis 11, table platform 12, and manipulator 120 may be operable to manipulate article 5. For example, controller 13 may be configured to receive or generate drive commands causing chassis 11, platform 12, and manipulator 120 to manipulate article 5.

Aspects of wheeled chassis 11 and table platform 12 may be similar to those described in a commonly owned U.S. patent Ser. No. 16/303,040, entitled "MOBILE WORK STATION FOR TRANSPORTING A PLURALITY OF ARTICLES," the entirety of which is incorporated by reference into this disclosure. For example, aspects of chassis 11 and platform 12 may be similar to chassis 102 and platform 110 of the '040 application.

Figure 5:
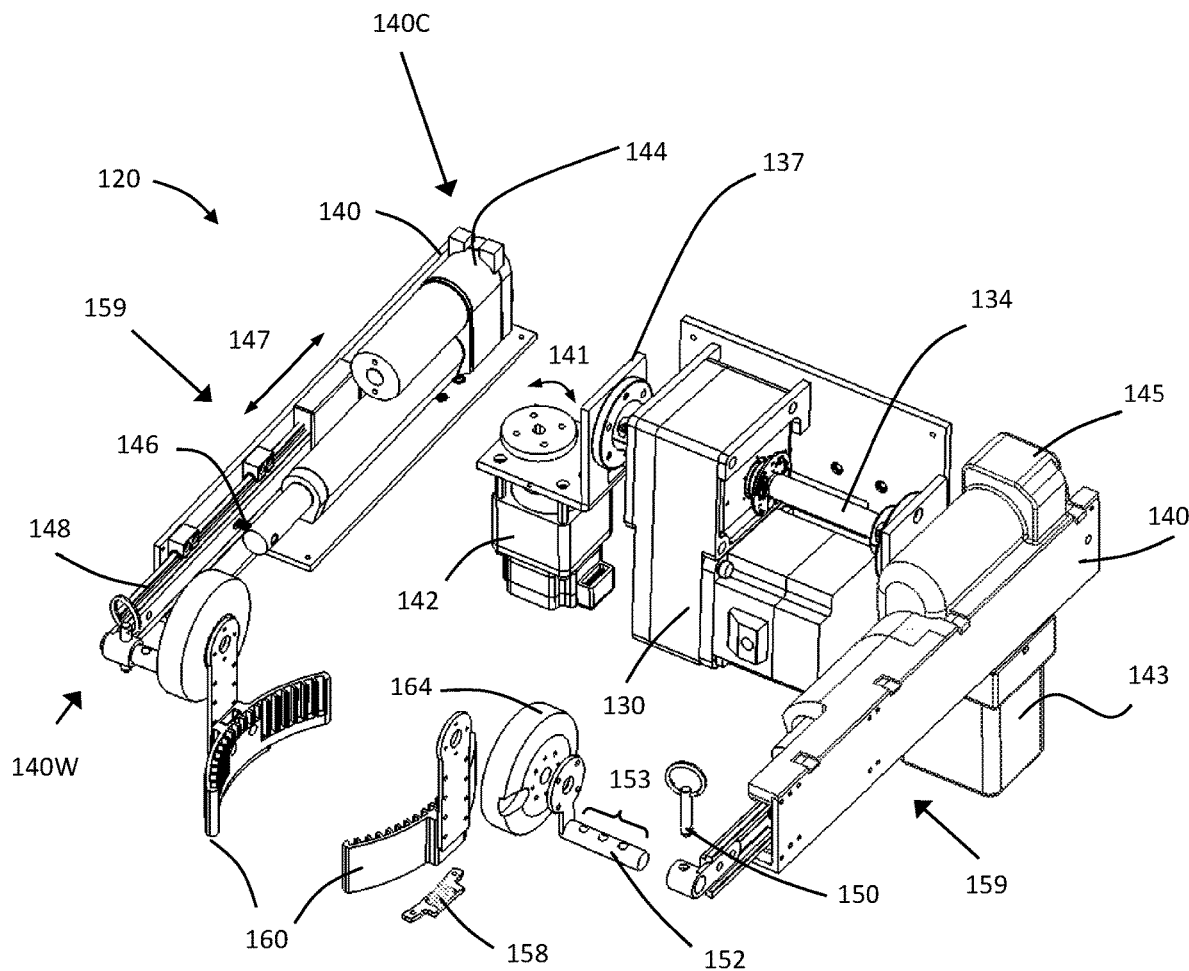
FIG. 5 is a partially exploded view of the manipulator apparatus of FIG. 1.

Manipulator 120 may be operably disposed on mobile robot 10 and configured to manipulate article 5. Any type of article 5 may be manipulated by manipulator 120 according to aspects of this disclosure. For example, article 5 may comprise any combination of boxes, containers, laboratory samples, luggage, packages, plant pots, and any like objects commonly moved about in commerce. As shown in FIG. 5, manipulator 120 may comprise: a lift actuator 130; a pair of arms 140; and a pair of end effectors 160. For convenience, some aspects of manipulator 120 are described with reference to aspects of both arms 140, whereas other aspects are described with reference to aspects of one arm 140, or at least one arm 140. Any such aspects may be claimed with respect to one or both arms 140, both of which are operable to manipulate article 5, individually and together.

Figure 3:
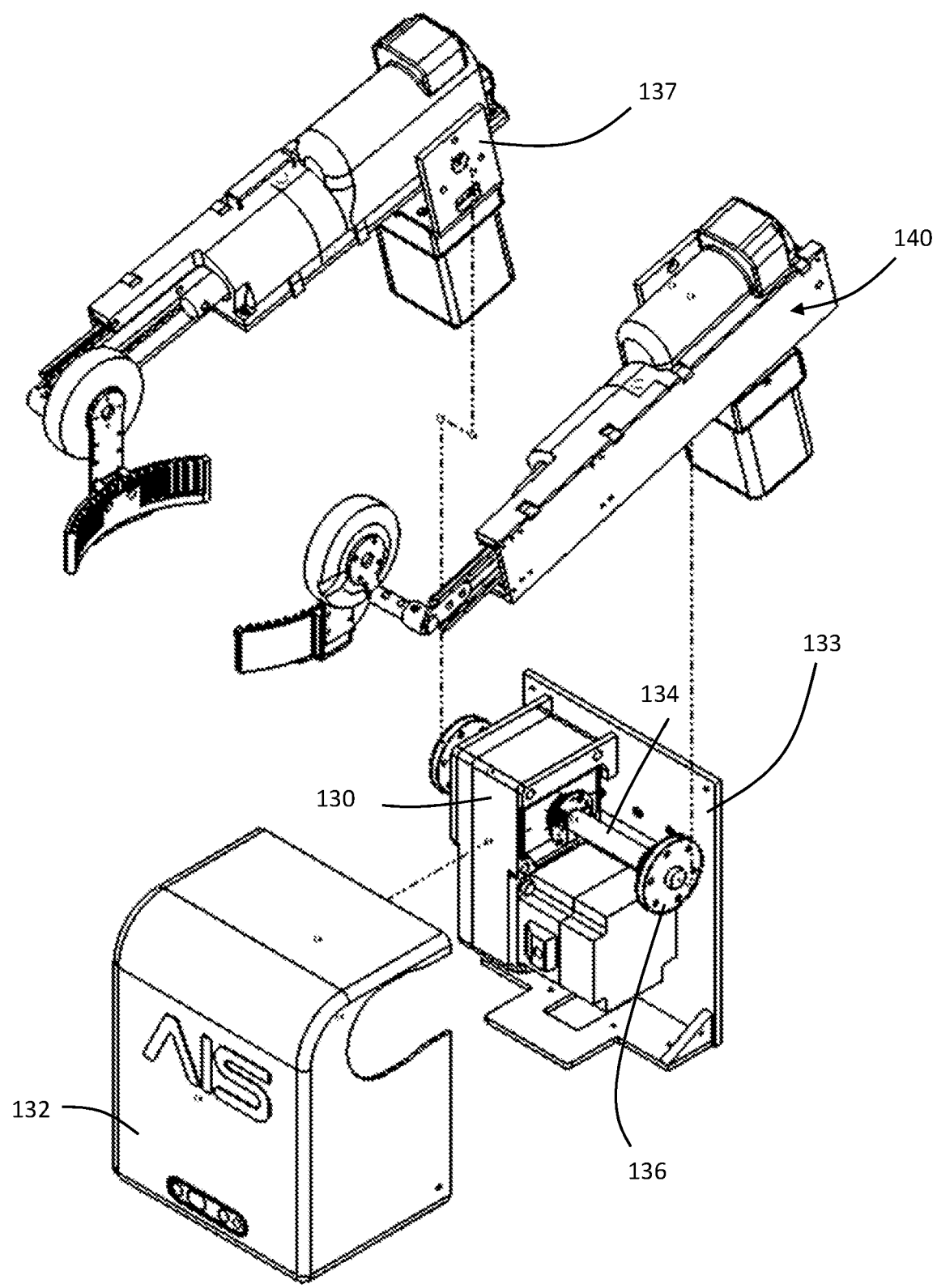
FIG. 3 is a partially exploded view of the manipulator apparatus of FIG. 1.

Referring to FIG. 3, lift actuator 130 may be operable to rotate a shaft 134 about a shaft axis, causing movements of pair of arms 140. For example, lift actuator 130 may be operable to move arms 140 with a pair of arm adapters 137 coupled with shaft 134 through a pair of shaft flanges 136 at each end of rotating shaft 134. An injected molded or 3D-printed, plastic or metallic cover 132 may be placed over lift actuator 130 to protect it from impact, dust and water. As shown in FIG. 3, lift actuator 130 may be attached to wheeled chassis 11 using a support plate 133 or similar structure.

Figure 4:
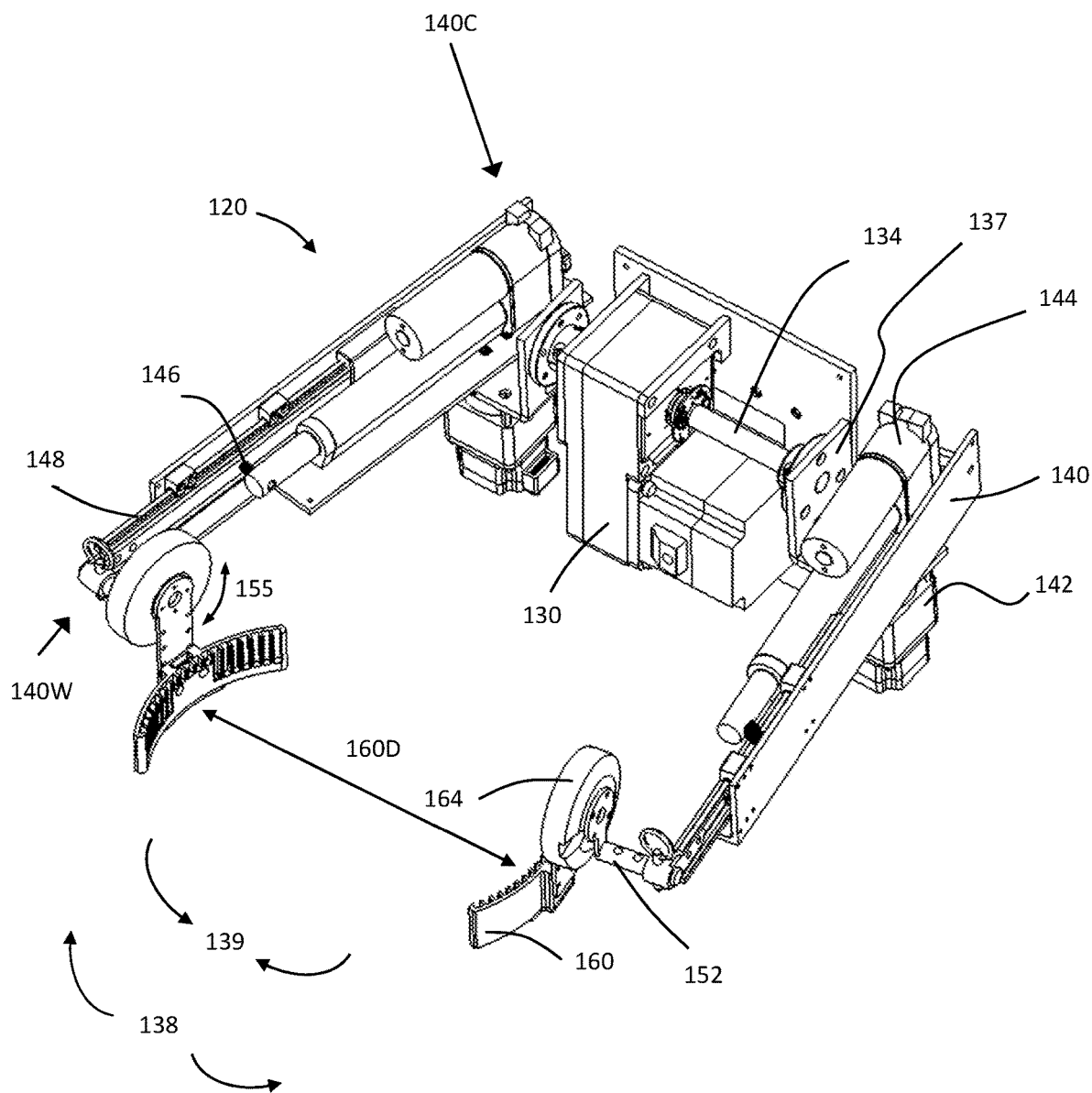
FIG. 4 is a perspective view of the manipulator apparatus of FIG. 1.

Referring to FIGS. 4 and 5, each arm 140 may comprise a connecting end 140C that is movably coupled to one of arm adapters 137 (e.g., by a hinge) and a working end 140W coupled to one of end effectors 160. Pair of arms 140 may comprise a pair of arm linkages 159 that permit movements of working ends 140W relative to connecting ends 140C. For example, manipulator 120 may comprise a pair of arm actuators 142 operable with arm linkages 159 to cause rotations of each corresponding arm 140 about different rotational axes in directions 141; and the rotations may move working end 140W relative to connecting end 140C. For example, simultaneously driving arm actuators 142 in opposite directions may cause arm linkages 159 to move end effectors 160 away from one another in opening directions 138 and toward one another in closing directions 139. Aspects of manipulator 120 also may be operable to linearly extend pair of arms 140 relative to manipulator. For example, manipulator 120 may comprise a pair of linear actuators 144; and each linear actuator 144 may be operable with arm linkages 159 to cause one of arms 140 to extend or shorten a longitudinal length of the one arm 140 away by moving a second arm link 148 through a connection 146 in a longitudinal expansion direction 147.

Aspects of manipulator 120 also may be operable to laterally extend pair of arms 140. For example, each arm 140 may comprise an end effector link 152 that is detachably connected to the end of each second arm link 148 using a release pin 150. Referring to FIG. 5, each end effector link 152 may be linearly adjustable. For example, each end effector link 152 may comprise a plurality of holes 153 corresponding to different positions of link 152 relative to the end of second arm link 148; and a lateral length of each end effector link 152 may be manually adjusted by moving pin 150 between one or more holes 153 to affix link 152 at each different position relative to the end of second arm link 148.

Referring to FIGS. 4 and 5, each end effector 160 may be coupled to one of working ends 140W of arms 140 by a rotatable connection. Different types of rotatable connections may be used to permit different rotations of end effectors 160 relative to working ends 140W. For example, each end effector 160 may be rotatably connected to one of end effector links 152. Each rotatable connection may be operable to cause a rotation of each end effector 160 that maintains an engagement orientation of end effector 160 relative to working end 140W. Different forces may be used to cause the rotation. Passive forces may be used to at least partially cause the rotation. For example, end effectors 160 may be operable with gravity forces to maintain the engagement orientation while manipulating article 5 so that an orientation of article 5 is maintained when being lifted. Aspects of manipulator 120 may be configured to control, increase, or otherwise modify the passive forces, as described below. In some aspects, each rotatable connection may permit rotations of end effectors 160 about an end effector rotational axis that is generally parallel with the shaft axis of shaft 134.

Active forces may be used to cause the rotation. Referring to FIG. 4, each end effector 160 may be rotatably connected to one of working ends 140W by an end effector actuator 164 operable to cause end effector 160 to maintain the engagement orientation while lifting article 5 so that an orientation of article 5 is maintained when being lifted. As shown, each actuator 164 may be operable to rotate one of end effectors 160 in different directions 155, allowing the engagement orientation of the one end effector 160 to be maintained when lifted by lift actuator 130 (e.g., about the shaft axis of shaft 134).

Manipulator 120 may comprise or be in communication with a sensor operable to provide orientation feedback for each end effector 160 by measuring an orientation angle of end effector 160 relative to a reference axis, such as a vertical axis, the shaft axis of shaft 134, or the rotation axis of one of actuators 142. The sensor may be approximate to each end effector 160. Referring to FIG. 5, the sensor may comprise an inertia sensor 158 that is one or adjacent (e.g., embedded in) each end effector 160 to provide the orientation feedback. Visual sensors (e.g., a camera) and/or wave-based sensors (e.g., lidar or radar) also may be used to provide the orientation feedback. As shown, a pair of arm actuator covers 143 may be placed around the arm actuators 142 to protect them from dust and water. Similarly, a pair of arm covers 145 may be disposed on the linear actuators 144. The orientation feedback sensor may be accessible through, mounted on, or integral with any of cover 132 (FIG. 3), covers 143, or covers 145.

Referring to FIG. 4, manipulator 120 may comprise a predetermined distance 160D extending between pair of end effectors 160; and pair of arms 140 may be operable to modify the predetermined distance 160D. Any predetermined distance may be used, such as an average width of a plurality of articles 5 within a working environment, such as a factory, a nursery, a warehouse, and the like.

Manual and/or automated means for modifying predetermined distance 160D are contemplated. For example, predetermined distance 160D may be modified by manually adjusting the length of end effector links 152 using pin 151 and plurality of holes 153, as described above. Predetermined distance 160D also may be modified by causing pair arm actuators 142 to rotate pair of arms 140 in opposite directions, as also described above. As a further example, manipulator 120 may comprise or be in communication with a sensor operable to determine a dimension of each article 5, and arm actuators 142 may be configured to automatically modify predetermined distance 160D based on the measured dimension.

Still referring to FIG. 4, an angle between end effectors 160 may change when arm actuators 142 are operated to cause rotations of arms 140 in opening directions 138 and closing directions 139. For example, at some predetermined distances 160D, end effectors 160 may be generally parallel to one other and have an angle of approximately 0 degrees between them. Predetermined distance 160D may be modified to adjust the angle between end effectors 160. For example, the length of end effector links 152 may be adjusted to select a set of predetermined distances 160D at which end effectors 160 are generally parallel. As a further example, an orientation of links 152 relative to arms 140 may be configured to select the set of predetermined distances 160D.

An exemplary method 1000 of manipulating article 5 with manipulator 120 is now described. Referring to FIGS. 6A to 6F and 19, method 1000 may comprise steps for causing manipulator 120 to move article 5 between a loading zone 17 adjacent mobile robot 10 (e.g., FIG. 6C) to an unloading zone 18 on the table platform 12 of mobile robot 10 (e.g., FIG. 6E). Aspects of manipulator 120 may be configured to accommodate any geometrical arrangements of zones 17 and 18 relative to mobile robot 10. For example, either zone 17 or 18 may be used for loading or unloading; and while one zone (e.g., zone 17) is shown as being forward of and lower than manipulator 120, and the other zone (e.g., zone 18) is shown as being rearward of and higher than manipulator 120, other arrangements may be possible. As a further example, wheeled chassis 11 may be operable on a ceiling so that the elevations of zones 17 and 18 are relative to the ceiling; and/or manipulator 120 may be mountable in a non-vertically oriented position, with zones 17 and 18 being relative thereto.

Figure 19:
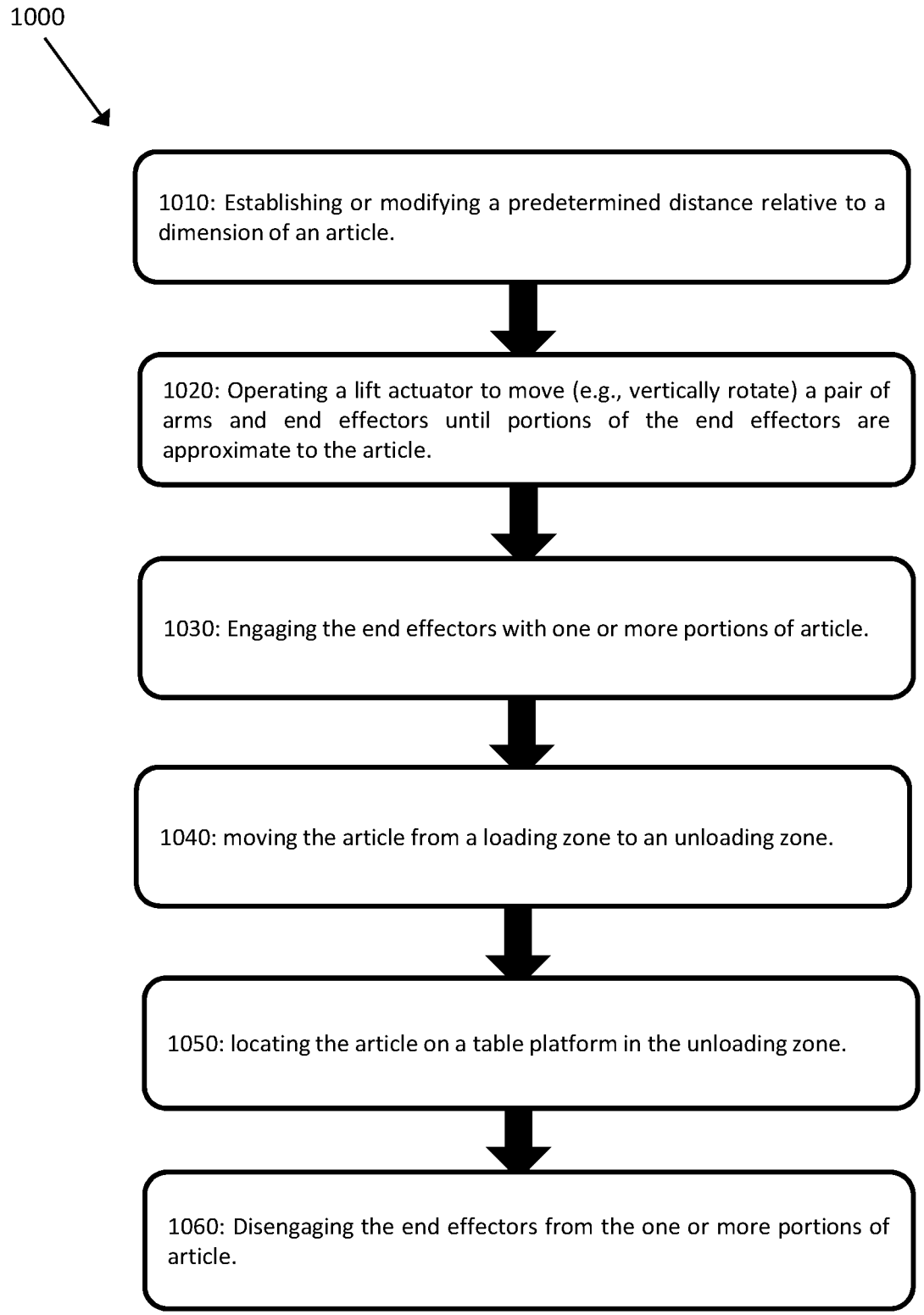
FIG. 19 is a flowchart of an exemplary method of operating any manipulator.

As shown in FIG. 19, method 1000 may comprise: (i) establishing or modifying predetermined distance 160D relative to a dimension of article 5 (as in FIG. 6A, a "configuration step 1010"); (ii) operating lift actuator 130 to move (e.g., vertically rotate) pair of arms 140 and end effectors 160 until portions of end effectors 160 are approximate to article 5 (as also in FIG. 6A, an "aligning step" 1020); (iii) engaging end effectors 160 with one or more portions of article 5 (as in FIG. 6B, an "engaging step" 1030); moving article 5 from loading zone 17 to unloading zone 18 (e.g., as in FIGS. 6C and 6D, a "moving step" 1040); (iv) locating article 5 on table platform 12 in unloading zone 18 (e.g., as in FIG. 6E, a "locating step" 1050); and (v) disengaging end effectors 160 from the one or more portions of article 5 (e.g., as in FIG. 6F, a "disengaging step 1060").

Figure 6A:
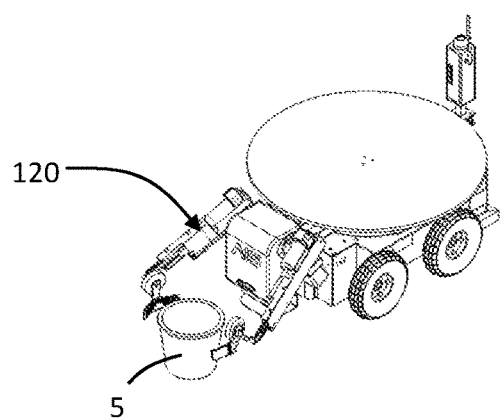
FIG. 6A is a perspective view of the system of FIG. 1 after positioning an exemplary article for engagement with the manipulator apparatus.
Figure 6B:
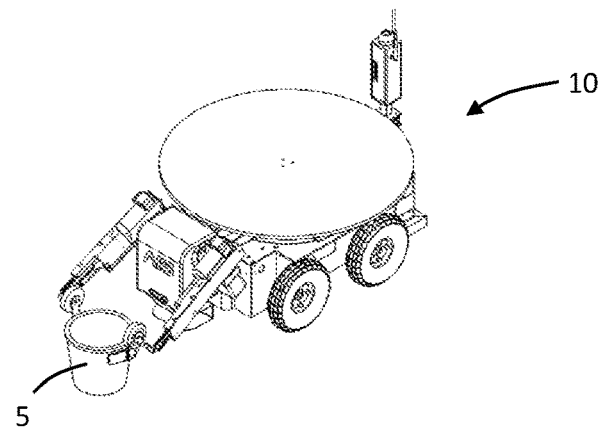
FIG. 6B is a perspective view of the system of FIG. 1 after engaging the article with the manipulator apparatus.

Each of steps 1010 to 1060 may comprise intermediate steps according to this disclosure. As shown in FIG. 6A, configuration step 1010 may comprise intermediate steps for establishing and/or modifying predetermined distance 160D manually or automatically (e.g., responsive to a sensor). As also shown in FIG. 6A, aligning step 1020 may comprise intermediate steps for causing lift actuator 130 to rotate pair of arms 140 (e.g., by rotating shaft 134) until a portion of arms 140, such as end effectors 160, is aligned with a portion of article 5 (e.g., at the same vertical level as the article 5) when predetermined distance 160D is greater than a dimension (e.g., a horizontal width) of article 5. As shown in FIG. 6B, engaging step 1030 may comprise intermediate steps for: simultaneously causing arm actuators 142 to rotate in opposite directions until each end effector 160 engages a side portion of article 5; causing end effectors 160 to form an opening not wider than the dimension of article 5; and/or engaging contact surfaces of end effectors 160 with the side portions of article 5. After completion of engaging step 1030, article 5 may be movable with arms 140 and thus ready for further manipulation.

Figure 6C:
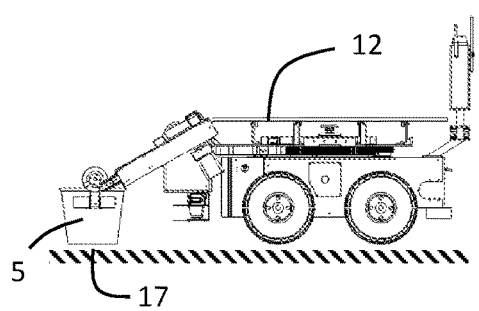
FIG. 6C is a side view of the system of FIG. 1 after engaging the article with the manipulator apparatus.
Figure 6D:
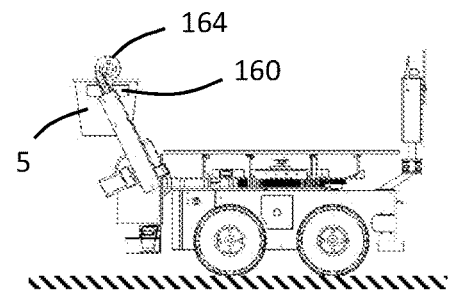
FIG. 6D is a side view of the system of FIG. 1 after lifting the article with the manipulator apparatus into a lifted position.

As shown in FIGS. 6C and 6D, moving step 1040 may comprise intermediate steps for causing lift manipulator 120 to rotate shaft 134 until arms 140, end effectors 160, and article 5 engaged therewith are moved from loading zone 17 to unloading zone 18. Each end effector 160 may be coupled to one of arms 140 by a rotatable connection; and the rotatable connection may be passively or actively operable to cause a rotation of the end effector 160 relative to the one arm 140. Therefore, moving step 1040 may comprise causing the rotation of end effector 160 to maintain an engagement orientation of end effector 160 while moving article 5 in step 1040 so that an orientation of article 5 is maintained when being lifted. For example, step 1040 may comprise: (a) causing end effector actuators 164 to rotate end effectors 160 in one or more directions 155 (e.g., FIG. 4); (b) receiving orientation feedback from a sensor (e.g., such as inertia sensor 158) (e.g., at regular intervals and/or in real time); and/or (c) further causing end effectors to rotate in directions 155 so as to maintain the engagement orientation responsive to the sensor. In this way, end effector actuators 164 may maintain the engagement orientation by causing a counter-rotation of end effectors 160 relative to arms 140.

Figure 6E:
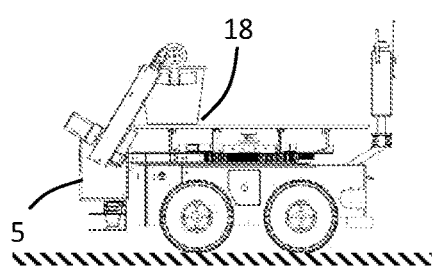
FIG. 6E is a side view of the system of FIG. 1 after lifting the article with the manipulator apparatus into a stowed position on the mobile robot.
Figure 6F:
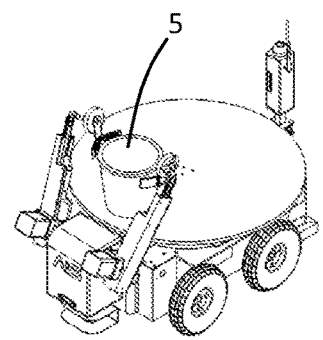
FIG. 6F is a perspective view of the system of FIG. 1 after lifting the article with the manipulator apparatus into a stowed position on the mobile robot.

As shown in FIG. 6E, locating step 1050 may comprise intermediate steps for determining a target location for article 5 on table platform 12 and/or causing platform 12 to move relative to manipulator 120 (or vice versa) in order to locate article 5 at the target location. As shown in FIG. 6F, disengaging step 1060 may comprise intermediate steps for causing end effectors 160 to disengage from article 5. For example, step 1060 may comprise causing arm actuators 142 to rotate in opposite directions until each contact surface of end effector 160 disengages from the side portion of article 5 and/or predetermined distance 160D is greater than the dimension of article 5, allowing arms 140 to be moved away from article 5. After completion of disengaging step 1060, method 1000 may be completed and/or started anew with another article 5.

It should be appreciated that steps and/or intermediate steps of method 1000 may be performed in a reverse order according to FIGS. 6A to 6F and 19 to move article 5 from unloading zone 18 (now a loading zone in this example) to loading zone 17 (now an unloading zone in this example).

Additional aspects of this disclosure are described with reference to an exemplary system 200. Aspects of system 200 may be similar to aspects of system 100, but within the 200 series numbers. For example, elements of system 200 may be similar to counterpart elements of system 100 aside from the differences described herein. Any aspects of systems 100 and 200 may be interchangeable with one another, each possible combination or iteration being part of this disclosure.

Figure 7:
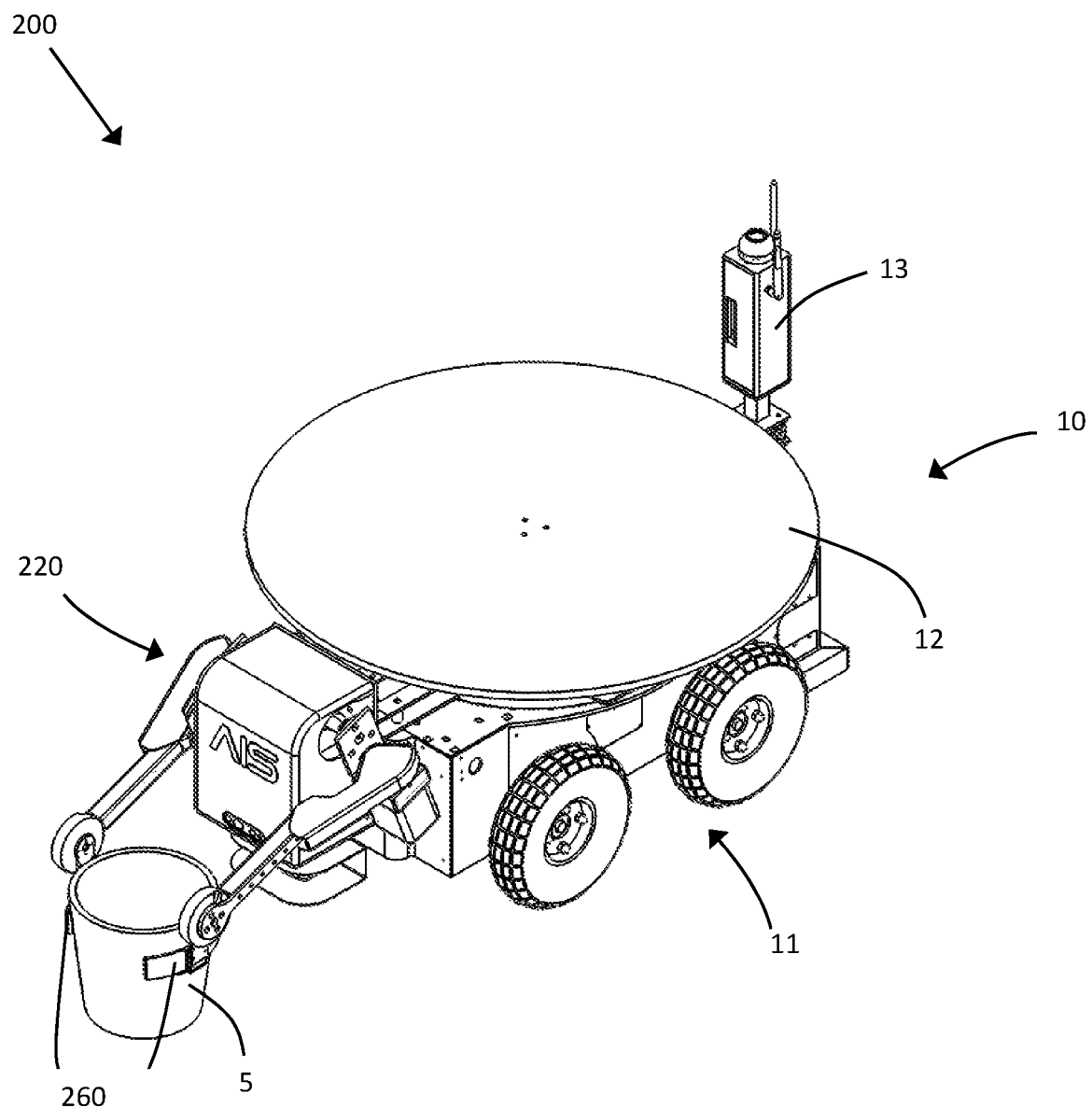
FIG. 7 is a perspective view of another exemplary system comprising another exemplary mobile robot and another exemplary manipulator apparatus.
Figure 8:
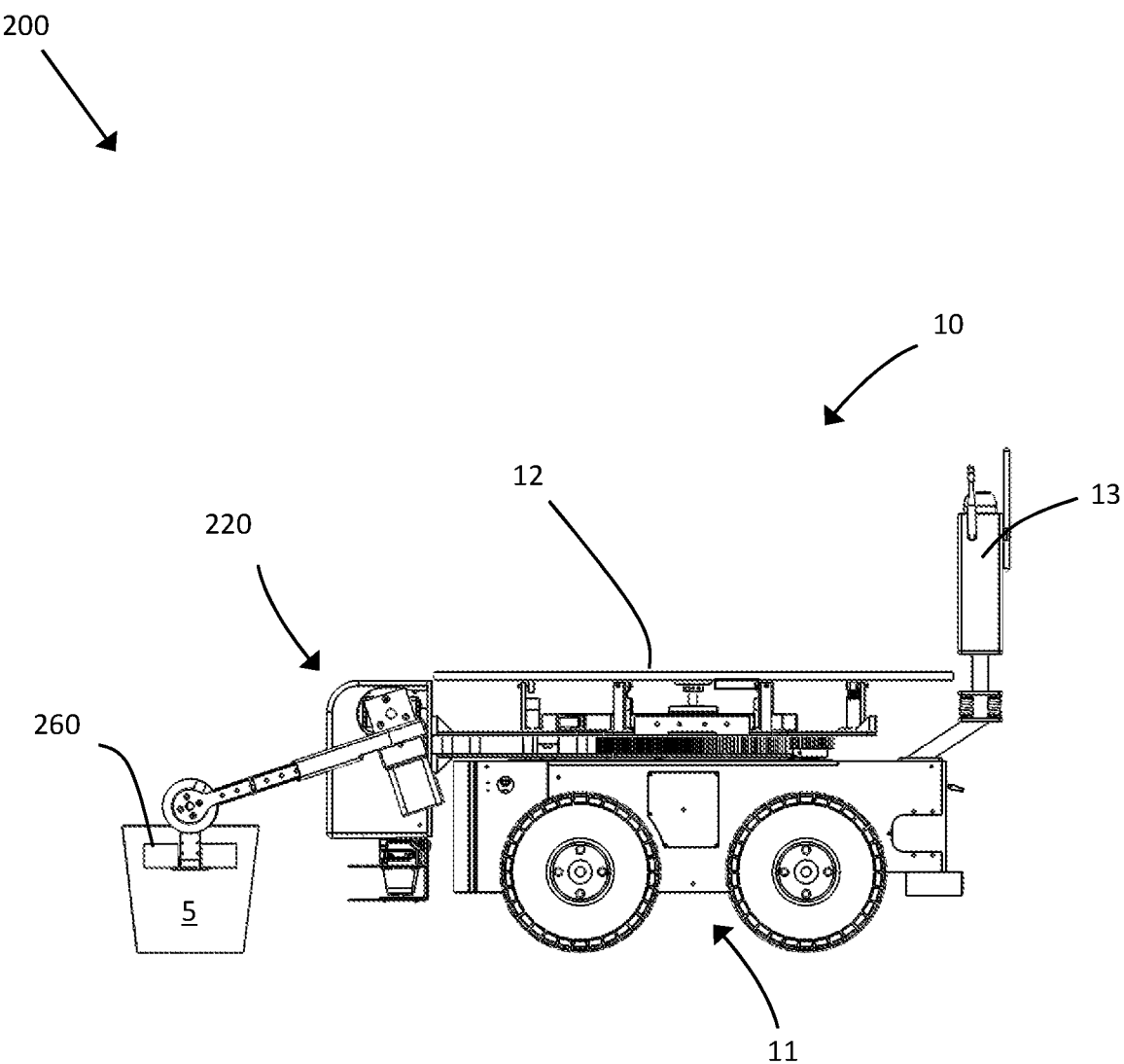
FIG. 8 is a side view of the system of FIG. 7.

Referring to FIGS. 7 and 8, system 200 may comprise mobile robot 10, which may again comprise wheeled chassis 11, table platform 12, and controller 13; and be similarly operable to manipulate exemplary article 5. As shown in FIGS. 7 and 8, system 200 may comprise a manipulator 220 operable with controller 13 to manipulate article 5 in a similar manner.

Figure 9:
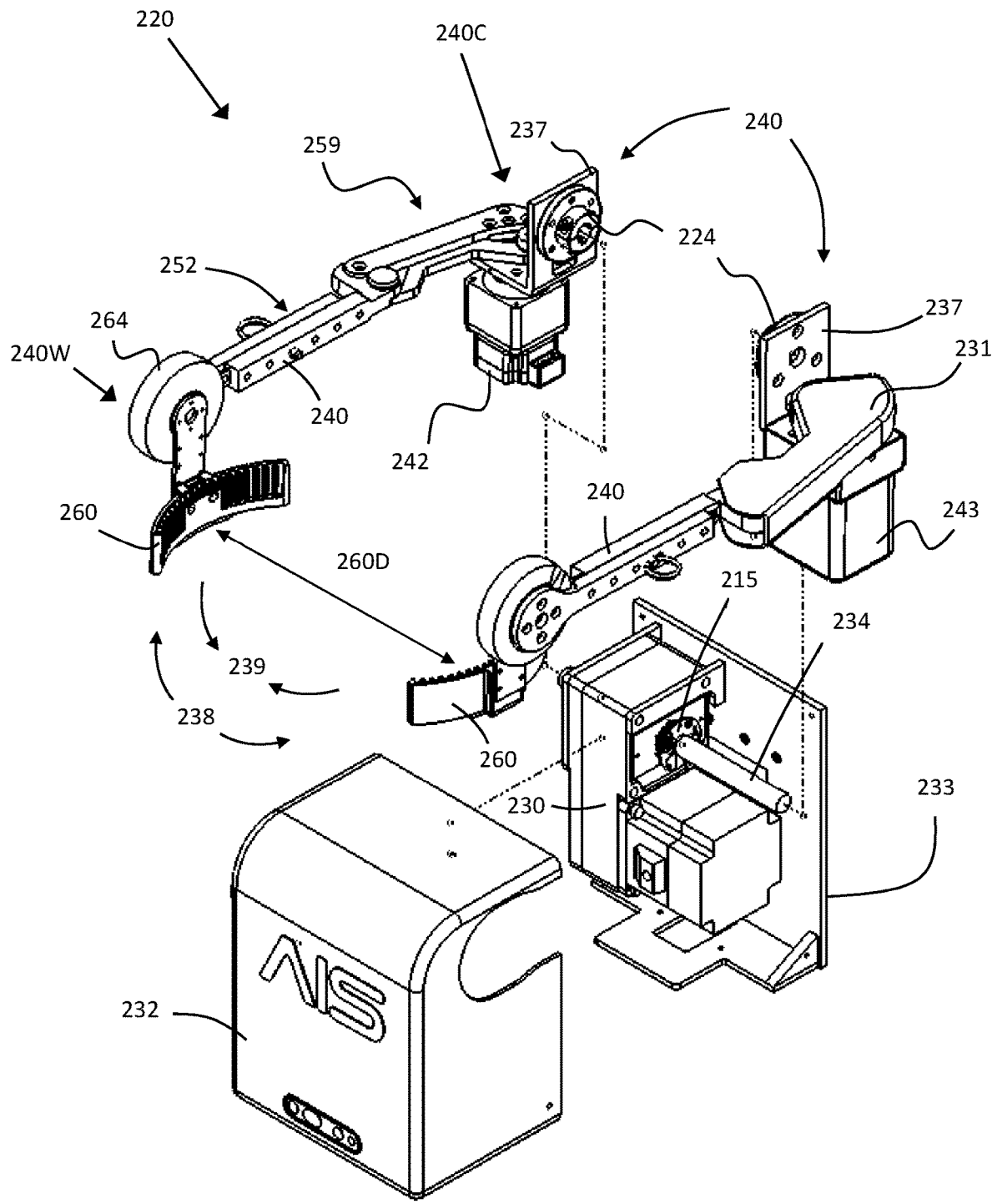
FIG. 9 is a partially exploded view of the manipulator apparatus of FIG. 7.

Manipulator 220, much like manipulator 120, may be operably disposed on mobile robot 10 and configured to manipulate article 5. As shown in FIG. 9, manipulator 220 may comprise: a lift actuator 230; a pair of arms 240; and a pair of end effectors 260. For convenience, as before, some aspects of manipulator 220 are described with reference to aspects of both arms 240, whereas other aspects are described with reference to aspects of one arm 240, or at least one arm 240; and any such aspects may be claimed with respect to one or both arms 240, both of which are operable to manipulate article 5, individually and together.

Referring to FIG. 9, lift actuator 230 may be operable to rotate a shaft 234 about a shaft axis, causing movements of pair of arms 240. For example, lift actuator 230 may comprise a pair of outwardly directed arm assemblies 224 that are attached (e.g., hinged) to a pair of arm adapters 237. Each arm adapter 237 may be attached to shaft 234 through a pair of shaft flanges (e.g., similar to flanges 136 of FIG. 3) at each end of shaft 234. Similar to above, an injected molded or 3D-printed, plastic or metallic cover 232 may be placed over lift actuator 230 to protect it from impact, dust, and water. As shown in FIG. 9, lift actuator 230 may be attached to chassis 11 (e.g., FIG. 7) using a support plate 233 or similar structure.

Figure 10:
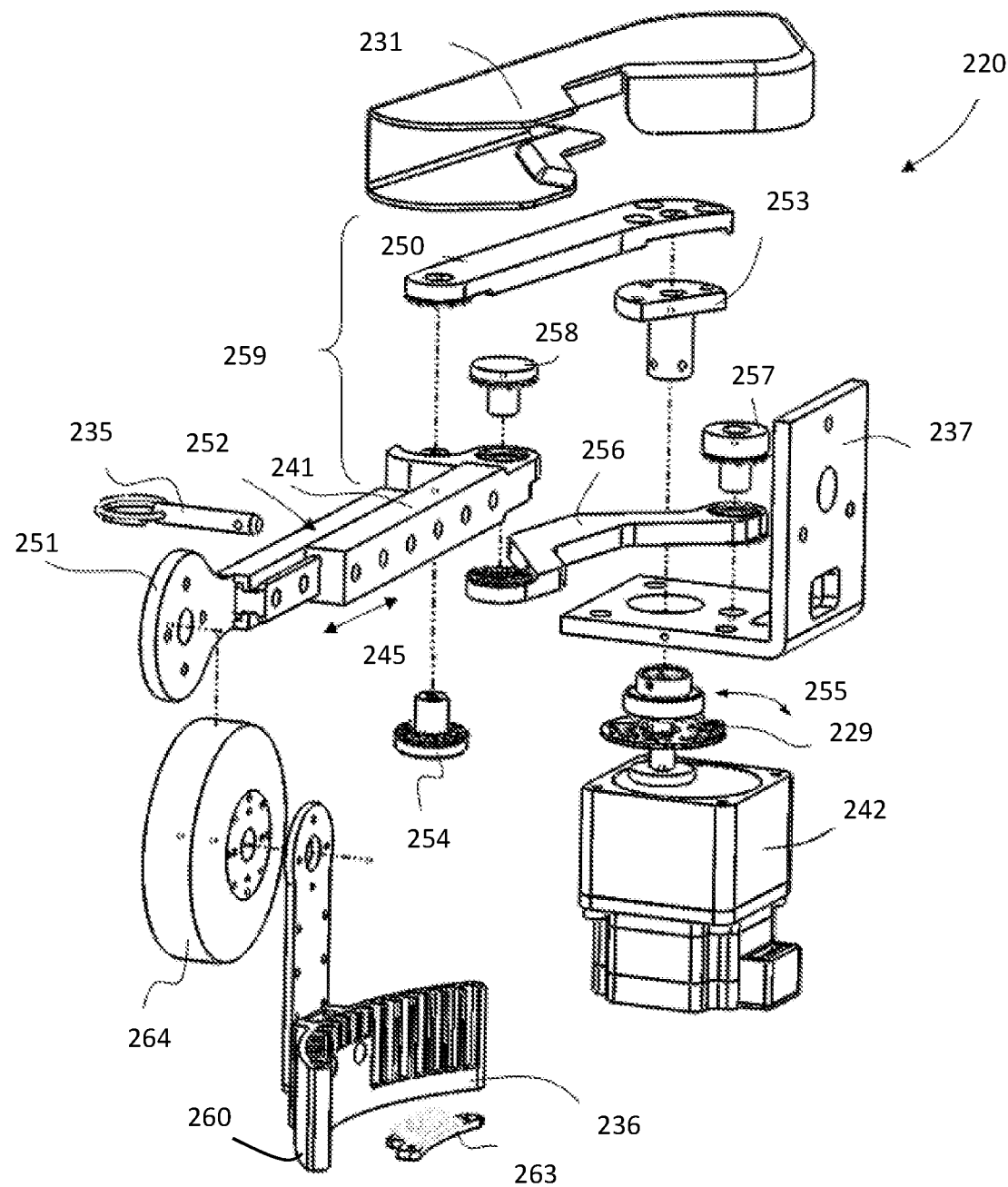
FIG. 10 is a partially exploded view of an arm linkage of the manipulator apparatus of FIG. 7.

Referring to FIGS. 9 and 10, each arm 240 may comprise a connecting end 240C that is movably coupled to one of arm adapters 237 (e.g., by a hinge) and a working end 240W coupled to one of end effectors 260. Each arm 240 may comprise a parallelogram linkage 259 operable to maintain a parallel alignment of working ends 240W. For example, parallelogram linkages 259 may be coupled with connecting ends 240C and a pair of arm actuators 242 operable with arm linkages 259 to cause movements of working ends 240W relative to connecting ends 240C while maintaining the parallel alignment between ends 240W. Similar to above, a pair of arm actuator covers 243 and a pair of parallelogram linkage covers 231 may be disposed on actuators 242 and linkages 259.

Referring to FIG. 9, manipulator 220 may comprise a predetermined distance 260D extending between pair of end effectors 260; and pair of arms 240 may be operable to modify predetermined distance 260D by any means. For example, each arm 240 may be rotatable, linearly extendable, and/or laterally extendable to modify the predetermined distance 260D, automatically or manually.

Referring still to FIG. 9, each arm 240 may comprise an end effector link 252 that is releasably coupled with (e.g., with a hinge) each parallelogram linkage 259. Each link 252 may be linearly adjustable relative to arm 240 so as to permit longitudinal movements of working end 240W relative to connecting end 240C. Referring to FIG. 10, end effector link 252 may comprise a first bar 241 coupled with linkage 259 and a second bar 251 coupled with first bar 241 and one of end effectors 260. Second bar 251 may be slidable relative to first bar 241 in a longitudinal direction 245. As shown in FIG. 10, a length of end effector link 252 may be varied by sliding second bar 251 relative to first bar 241 in longitudinal direction 245 and maintained by affixing second bar 251 to first bar 241 using a quick-release pin 235.

As with system 100, each arm actuator 242 in system 200 may be operable with one of arm linkages 259 to establish and/or modify predetermined distance 260D between end effectors 260 by causing movements of working end 240W relative to connecting end 240C. In contrast to system 100, simultaneously driving arm actuators 242 of system 200 in opposite directions may cause parallelogram arm linkages 259 to control distance 260D by both: (i) moving working ends 240W and end effectors 260 away from one another in opening directions 238 and toward one another in closing directions 239; and (ii) maintaining the parallel alignment between working ends 240W while moving in directions 238 and 239. End effectors 260 may be configured to maintain the parallel alignment, thereby allowing a contact surface 236 of each end effector 260 to make parallel contact with portions of article 5, such as opposing side portions.

Additional aspects of parallelogram arm linkages 259 are now described. Referring to FIG. 10, which depicts an exploded view of one arm 240, each parallelogram linkage 259 may comprise: a first link 250 coupled to arm adapter 237 and arm actuator 242; and a second link 256 coupled to arm adapter 237 and end effector link 252. For example, a proximal end of first link 250 may be coupled to arm adapter 237 and arm actuator 242 with a pin 253; and a distal end of link 250 may be coupled to first bar 241 with a pin 254. As a further example, a proximal end of second link 256 may be coupled to arm adaptor 237 with a pin 257; and a distal end of link 256 may be coupled to first bar 241 with a pin 258. As shown in FIG. 10, arm actuator 242 may be operable to cause a rotation of first link 250 in a rotational direction 255; and the rotation may cause parallelogram linkage 259 to move working end 240W while maintaining the parallel alignment.

Referring to FIGS. 9 and 10, each end effector 260 may be coupled to one of working ends 240W of arms 240 by a rotatable connection. As before, different types of rotatable connections may be used to permit different rotations of end effectors 260 relative to working ends 240W and cause end effector 260 to maintain the engagement orientation while lifting article 5 so that an orientation of article 5 is maintained. Each end effector 260 may be rotatably connected to one of ends 240W by an end effector actuator 264. For example, each end effector actuator 264 may be fixed to the distal end of end effector link 252 and operable to cause a rotation of one of end effectors 260. In this example, each end effector actuator 264 may be operable to move one of end effectors 260 in different directions, allowing the engagement orientation of the one end effector 260 to be maintained.

Referring to FIG. 10, manipulator 220 may comprise a sensor 263 operable to provide orientation feedback for end effectors 260, such as an inertia sensor, an IMU, accelerometer, and/or a gyroscope positioned relative to each end effector 260 in order to provide orientation the feedback while end effector 260 is being lifted. As shown in FIG. 10, sensor 263 may be mounted on or behind contact surface 236 of each end effector 260. Manipulator 220 also may comprise a sensor 229 operable to determine the rotation of each link 250. For example, sensor 229 may comprise an encoder operable to provide rotational feedback by determining an amount of the rotation of link 250 in real-time. As shown in FIG. 9, manipulator 220 also may comprise a sensor 215 operable to determine the rotation of shaft 234. For example, sensor 215 may comprise an encoder operable to provide rotational feedback by determining an amount of the rotation of shaft 234 in real-time.

Manipulator 220 may comprise a controller unit (e.g., controller 13 or another controller in communication therewith) configured to: (i) receive the position feedback from sensor 263, the rotational feedback from sensor 229, the rotational feedback from sensor 215, and similar feedback data from any other sensors within system 200; and (ii) output drive commands for one or more of lift actuator 230, arm actuators 242, and/or end effector actuators 264. For example, the drive commands may cause end effector 260 to maintain the engagement orientation while lifting article 5 so that an orientation of article 5 is maintained while being lifted.

Figure 11C:
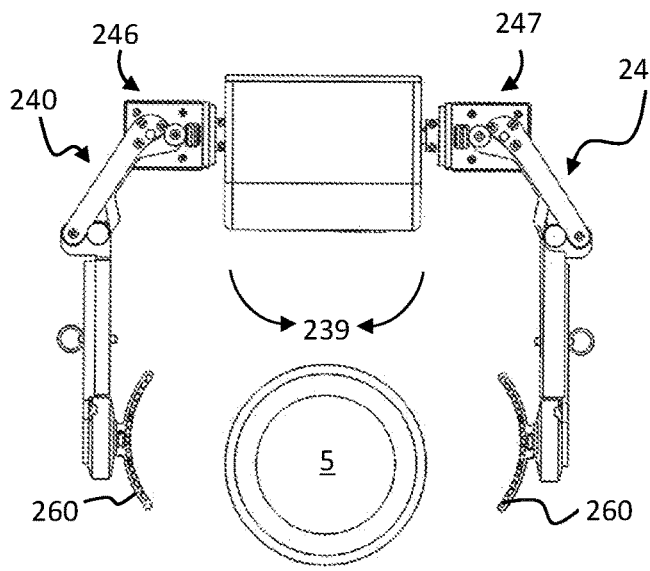
FIG. 11C is a top-down view of the manipulator apparatus of FIG. 7 after engaging the article with the manipulator apparatus.
Figure 11C:
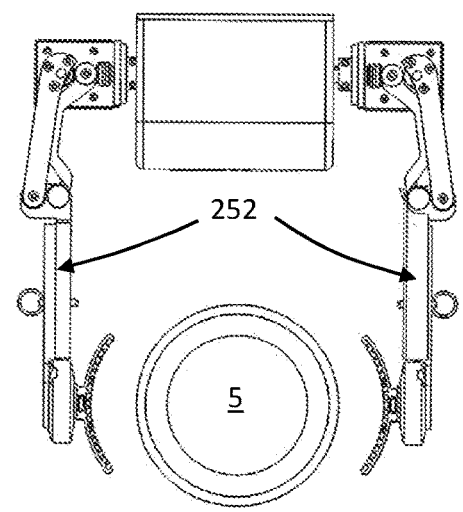
Figure 11C:
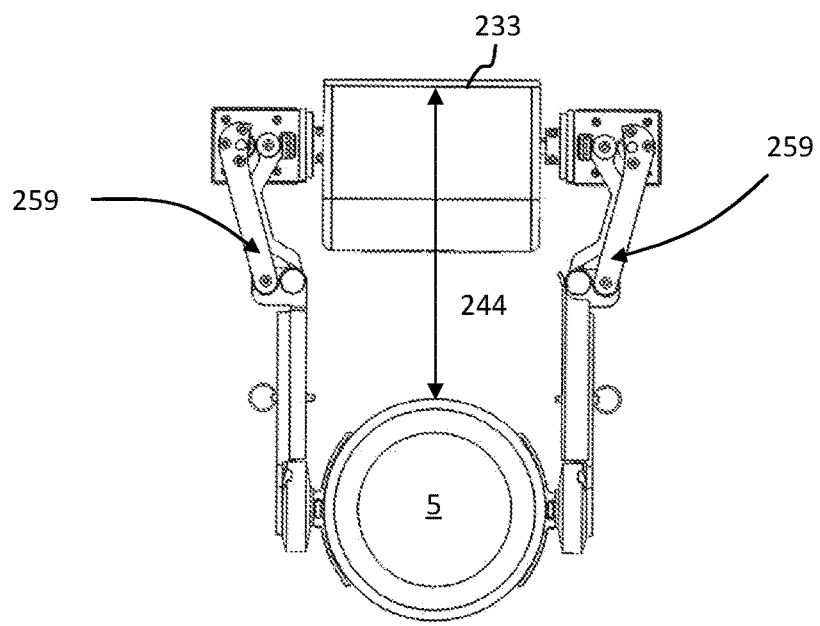

Referring to FIGS. 11A-C, an example of manipulator 220 being operated to manipulate article 5 is shown. Referring to FIG. 11A, arms 240 may be moved in closing directions 239 by causing a first one of actuators 242 to rotate in a first direction 246 and a second one of actuators 242 to rotate in a second direction 247 that is opposite of first direction 246. Actuators 242 may be rotated simultaneously so that end effectors 260 make simultaneous parallel contact with article 5. Referring to FIGS. 11B and 11C, as each arm 240 is being moved toward article 5, the pair of end effector links 252 and/or working ends 240W may stay parallel by operation of parallelogram linkages 259. If needed, the longitudinal length of each links 252 may be adjusted to adjust a longitudinal distance 244 between a portion of manipulator 220 (e.g., plate 233) and a portion of article 5.

Figure 12A:
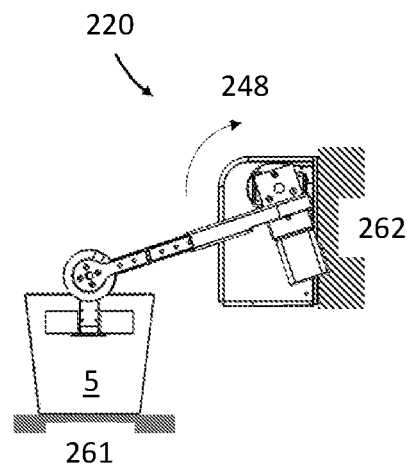
FIG. 12A is a side view of the manipulator apparatus of FIG. 7 after engaging the article with the manipulator apparatus.
Figure 12B:
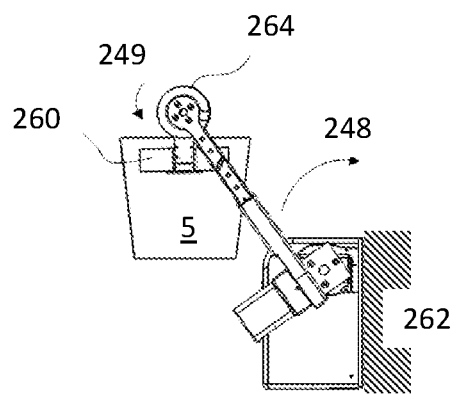
FIG. 12B is a side view of the manipulator apparatus of FIG. 7 after lifting the article with the manipulator apparatus to a lifted position.
Figure 12C:
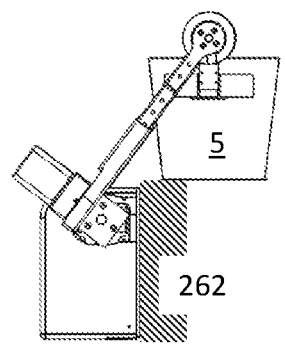
FIG. 12C is a side view of the manipulator apparatus of FIG. 7 after lifting the article with the manipulator apparatus into a stowed position on the mobile robot.

Referring to FIGS. 12A-C, another example of manipulator 220 being operated to manipulate article 5 is shown. Referring to FIG. 12A, manipulator 220 may be affixed to a datum structure 262 (e.g., a portion of mobile robot 10) and article 5 may rest on a resting surface 261 (e.g., the ground) in a loading zone forward of manipulator 220. For example, once end effectors 260 have been operated to engage article 5, lift actuator 230 (e.g., FIG. 9) may be operable to cause shaft 234 to rotate in a first rotational direction 248 about the shaft axis of shaft 234 to lift article 5 from surface 261. Referring to FIGS. 12B and 12C, as shaft 234 rotates further in first rotational direction 248, each end effector 260 may be simultaneously rotated in a second rotational direction 249 to maintain the engagement orientation of end effectors 260 while lifting article 5 so that an orientation of article 5 is maintained. As shown, actuators 264 may simultaneously rotate end effectors 260 in direction 249 to keep article 5 in a horizontal alignment relative to surface 261, thereby preventing the contents of article 5 from spilling while being lifted. For example, second rotational direction 249 may be parallel to first rotational direction 248 but in an opposite direction. When moving article 5, end effectors 260 may be actively rotated by end effector actuators 264 in either direction 248 or 249 to maintain any alignment of article 5, such as the horizontal alignment shown in FIGS. 12A-C, or any other alignment relative to datum structure 262 or surface 261. As described, rotations of end effector actuators 264 may be controlled in real-time based on the orientation feedback coming from sensor 263.

It should be appreciated that aspects of method 1000, such as moving step 1040, locating step 1050, and disengaging step 1060 may be modified to accommodation variations of manipulator 220 without departing from this disclosure. For example, each of steps 1040, 1050, and 1060 may be modified to maintain the parallel alignment of working ends 240W and/or end effectors 260 described above.

Additional aspects of this disclosure are described with reference to an exemplary system 300. Aspects of system 300 may be similar to aspects of systems 100 and 200, but within the 300 series numbers. For example, elements of system 300 may be similar to counterpart elements of systems 100 and 200 aside from the differences described herein. Any aspects of systems 100, 200, and 300 may be interchangeable with one another, each possible combination or iteration being part of this disclosure.

Figure 13:
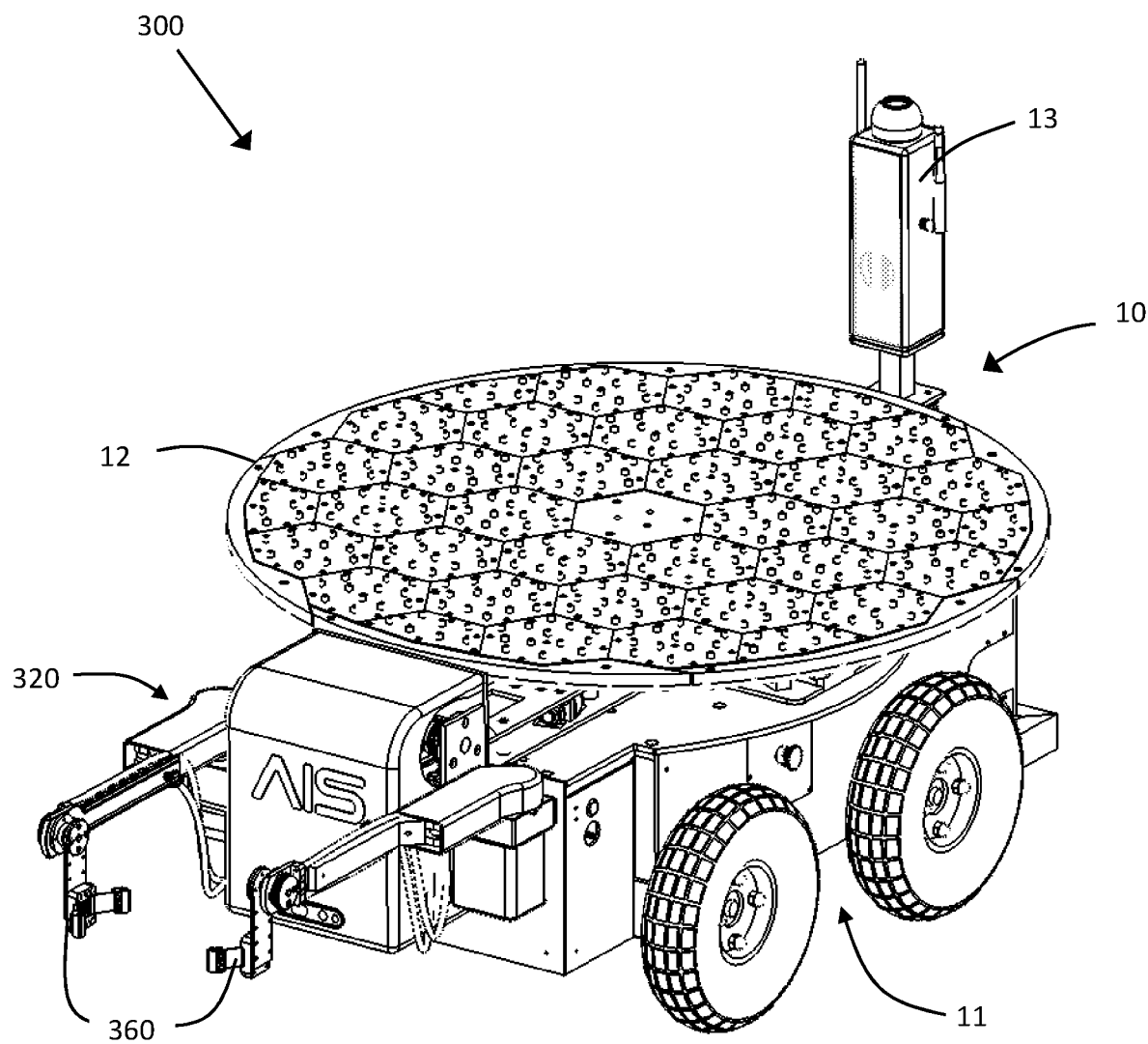
FIG. 13 is a perspective view of yet another exemplary system comprising yet another exemplary mobile robot and yet another exemplary manipulator apparatus.

Referring to FIG. 13, system 300 may comprise mobile robot 10, which may again comprise wheeled chassis 11, table platform 12, and controller 13; and be similarly operable to manipulate exemplary article 5. As shown in FIG. 13, system 300 may comprise a manipulator 320 operable (e.g., with controller 13) to manipulate article 5 in a similar manner. A top surface of platform 12 may be textured to engage a bottom surface of article 5 in this example.

Figure 14:
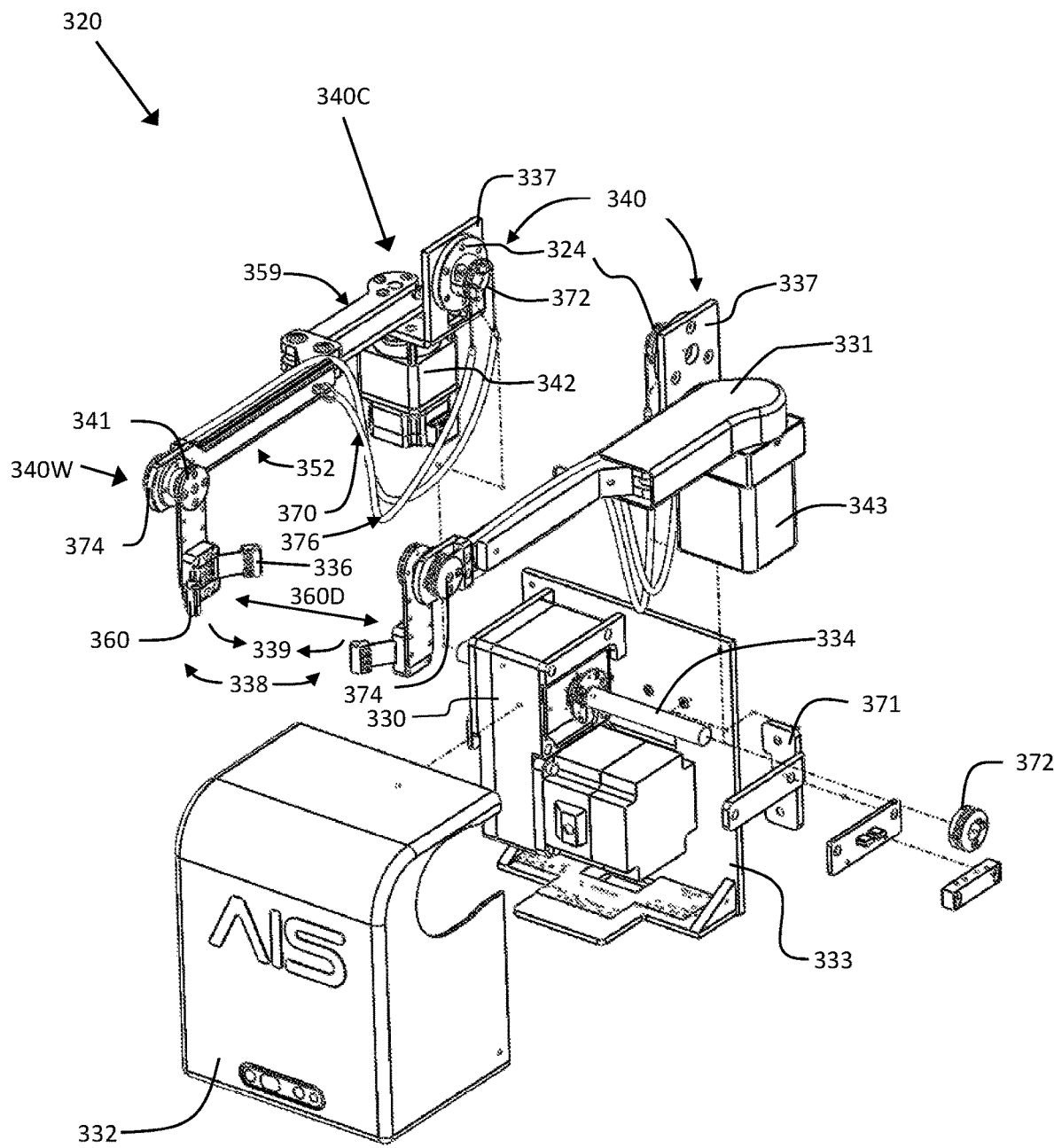
FIG. 14 is a partially exploded view of the manipulator apparatus of FIG. 13.
Figure 15:
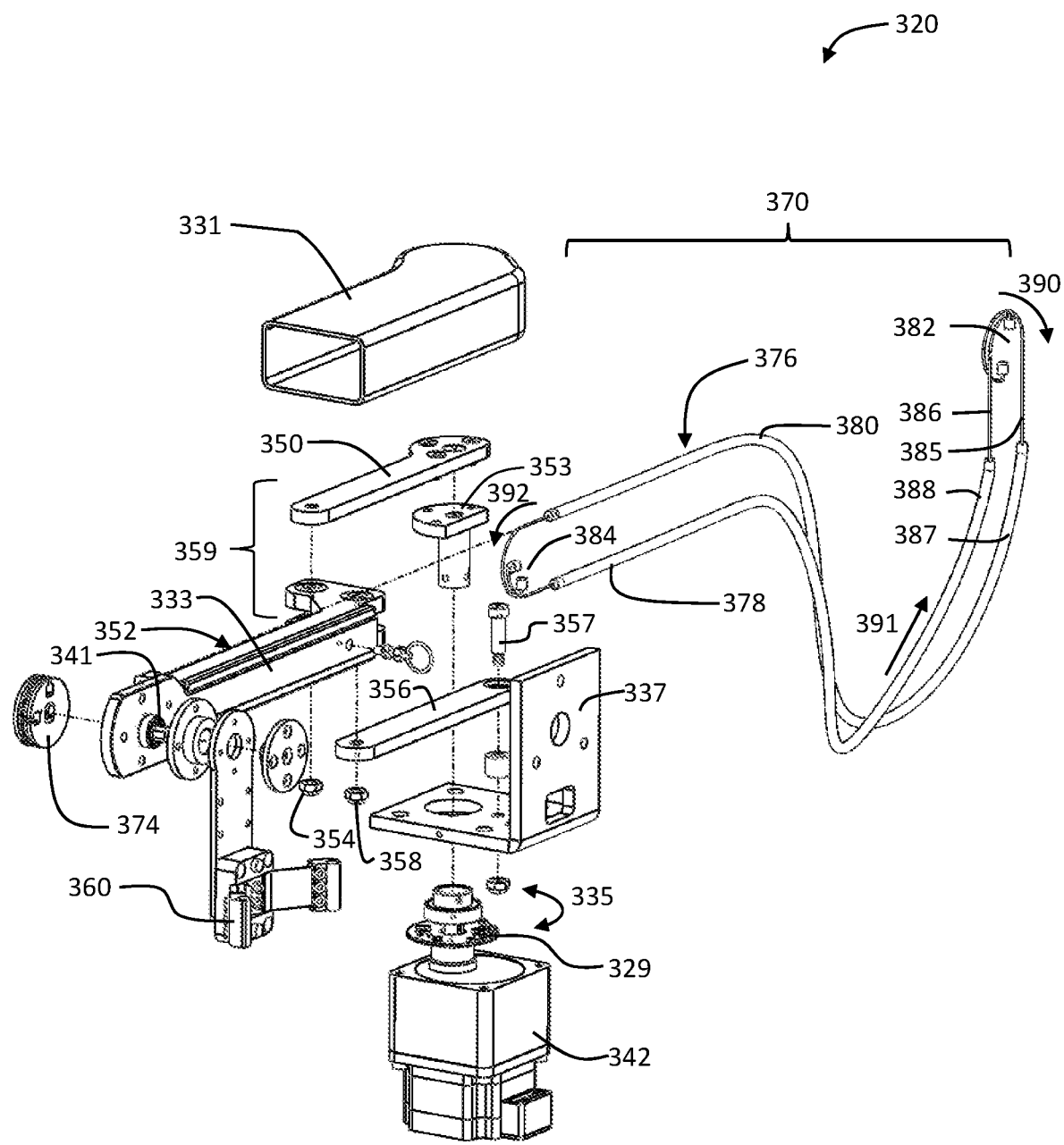
FIG. 15 is a partially exploded view of an arm linkage of the manipulator apparatus of FIG. 13.

Manipulator 320, much like manipulators 120 and 220, may be operably disposed on mobile robot 10 and configured to manipulate article 5. As shown in FIGS. 13 and 14, manipulator 320 may comprise: a lift actuator 330; a pair of arms 340; and a pair of end effectors 360. For convenience, as before, some aspects of manipulator 320 are described with reference to aspects of both arms 340, whereas other aspects are described with reference to aspects of one arm 340, or at least one arm 340; and any such aspects may be claimed with respect to one or both arms 340, both of which are operable to manipulate article 5, individually and together. Referring to FIGS. 14 and 15, manipulator 320 also may comprise a cable linkage 370 operable to guide movements of end effectors 360. In some aspects, cable linkage 370 may be provide increased reliability and speed when maintaining an engagement orientation of end effectors 360.

Referring to FIG. 14, lift actuator 330 may be operable to rotate a shaft 334 about a shaft axis, causing movements of pair of arms 340. For example, lift actuator 330 may comprise a pair of outwardly directed arm assemblies 324 that are attached (e.g., hinged) to a pair of arm adapters 337. Each arm adaptor 337 may be attached to shaft 334 through a pair of shaft flanges (e.g., similar to flanges 136 of FIG. 3) at each end of shaft 334. Similar to above, an injected molded or 3D-printed, plastic or metallic cover 332 may be placed over lift actuator 330 to protect it from impact, dust, and water. As shown in FIG. 14, lift actuator 330 may be attached to chassis 11 (e.g., FIG. 13) using a support plate 333 or similar structure.

Referring to FIGS. 14 and 15, each arm 340 may comprise a connecting end 340C that is movably coupled to one of arm adapters 337 (e.g., by a hinge) and a working end 340W coupled to one of end effectors 360. Each arm 340 may comprise a parallelogram linkage 359 operable to maintain a parallel alignment of working ends 340W. For example, parallelogram linkage 359 may be coupled with connecting ends 340C and a pair of arm actuators 342 operable with arm linkage 359 to cause movements of working ends 340W relative to connecting ends 340C while maintaining the parallel alignment between ends 340W. Similar to above, a pair of arm actuator covers 343 and a pair of parallelogram linkage covers 331 may be disposed on actuators 342 and linkages 359.

Referring to FIG. 14, manipulator 320 may comprise a predetermined distance 360D extending between pair of end effectors 360; and pair of arms 340 may be operable to modify predetermined distance 360D by any means. For example, each arm 340 may be rotatable, linearly extendable, and/or laterally extendable to modify the predetermined distance 360D, automatically or manually.

Referring still to FIG. 14, each arm 340 may comprise an end effector link 352 that is releasably coupled with (e.g., with a hinge) each parallelogram linkage 359. Similar to end effector links 252, each end effector link 352 also may be linearly adjustable relative to arm 340 so as to permit longitudinal movements of working end 340W relative to connecting end 340C.

As with systems 100 and 200, each arm actuator 342 may be operable with one of arm linkages 359 to establish and/or modify predetermined distance 360D between end effectors 360 by causing movements of working end 340W relative to connecting end 340C. Like system 200, simultaneously driving arm actuators 342 of system 300 in opposite directions may cause parallelogram arm linkages 359 to control distance 360D by both: (i) moving working ends 340W and end effectors 360 away from one another in opening directions 338 and toward one another in closing directions 339; and (ii) maintaining the parallel alignment between working ends 340W while moving in directions 338 and 339. End effectors 360 may be configured to maintain the parallel alignment, thereby allowing a contact surface 336 of each end effector 360 to make parallel contact with portions of article 5, such as opposing side portions.

Additional aspects of parallelogram arm linkages 359 are now described. Referring to FIG. 15, which depicts an exploded view of one arm 340, each parallelogram linkage 359 may comprise: a first link 350 coupled to arm adapter 337 and arm actuator 342; and a second link 356 coupled to arm adapter 337 and end effector link 352. For example, a proximal end of first link 350 may be coupled to arm adapter 337 and arm actuator 342 with a pin 353; and a distal end of link 350 may be coupled to first bar 333 with a pin 354. As a further example, a proximal end of second link 356 may be coupled to arm adaptor 337 with a pin 357; and a distal end of link 356 may be coupled to first bar 333 with a pin 358. As shown in FIG. 15, arm actuator 342 may be operable to cause a rotation of first link 350 in a rotational direction 335; and the rotation may cause parallelogram linkage 359 to move working end 340W while maintaining the parallel alignment.

As also shown in FIG. 15, manipulator 320 may comprise a sensor 329 operable to determine the rotation of each link 350. For example, sensor 329 may comprise an encoder operable to provide rotational feedback by determining an amount of the rotation of link 350 in real-time.

Aspects of cable linkage 370 are now described. As shown in FIG. 14, cable linkage 370 may comprise: (i) a first rotating anchor 372 disposed on a joint 371 of shaft 334 and plate 333; (ii) a second rotating anchor 374 disposed on a joint 341 between end effector 360 and end effector link 352; and (iii) at least one cable 376 running between first anchor 372 and second anchor 374.

At least one cable 376 may comprise one or more elongated force transfer elements of any kind, such as a cable, a flexible rod, or the like. As shown in FIG. 15, cable 376 may comprise: a first cable 378 and a second cable 380. A first end 382 of each cable 378 and 380 may be connected to first rotating anchor 372 (FIG. 14); and a second end 384 of each cable 378 and 380 may be connected to second rotating anchor 374 (also FIG. 14). Each rotating anchor 372 and 374 may rotate with respect to the joint to which it is attached. For example, second rotating anchor 374 may rotate with respect to joint 341, but is fixed with respect one of end effectors 360, such that when second rotating anchor 374 is rotated in a direction about the joint 341, the one end effector 360 rotates in the same direction.

Each cable 378, 380 may comprise an outer sheath 387, 388; and an internal cable 385, 386 respectively. Outer sheaths 387, 388 may be flexible to allow the cables 378, 380 to bend when arm 340 is moved. Internal cables 385, 386 may be operable to transfer forces between first rotating anchor 372 and second rotating anchor 374. For example, if first rotating anchor 372 is rotated in a first rotary direction 390, first end 382 of cable 376 may be rotated in the same direction, causing internal cable 386 of second cable 380 to be pulled in a first direction 391. These rotations may cause second end 384, and thereby second rotating anchor 374, to rotate in a second rotary direction 392 opposite to first rotary direction 390. Conversely, if first rotating anchor 372 is rotated in second rotary direction 392, then first end 382 of cable 376 may be rotated in the same direction, causing internal cable 385 of the first cable 378 to be pulled in first direction 391, further causing second end 384, and thereby second rotating anchor 374 to rotate in first rotary direction 390. The direction and amount of rotation between first and second rotating anchors 372, 374 may thereby be kept equal and opposite. Because first rotating anchor 372 is rotatable with respect to plate 333, and second rotating anchor 374 is fixed relative to the engagement orientation of end effector 360 yet rotatable with respect to arm 340, the engagement orientation of end effector 360 may be kept constant with respect to plate 333 regardless of the orientation of arm 340 relative to end effector 360.

Figure 16A:
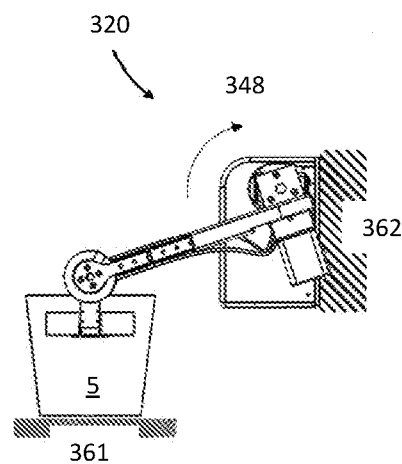
FIG. 16A is a side view of the manipulator apparatus of FIG. 13 after engaging the article with the manipulator apparatus.
Figure 16B:
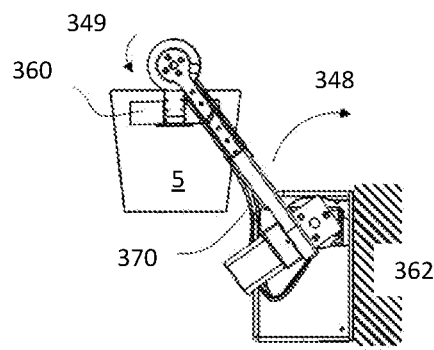
FIG. 16B is a side view of the manipulator apparatus of FIG. 13 after lifting the article with the manipulator apparatus to a lifted position.
Figure 16C:
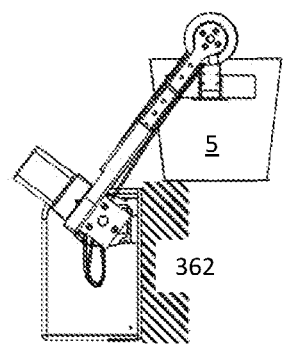
FIG. 16C is a side view of the manipulator apparatus of FIG. 13 after lifting the article with the manipulator apparatus into a stowed position on the mobile robot.

Referring to FIGS. 16A-C, an example of manipulator 320 being operated to manipulate article 5 is shown. Referring to FIG. 16A, manipulator 320 may be affixed to a datum structure 362 (e.g., a portion of mobile robot 10) and article 5 may rest on a resting surface 361 (e.g., the ground) in a loading zone forward of manipulator 320. For example, once end effectors 360 have been operated to engage article 5, lift actuator 330 may be operable to cause shaft 334 to rotate in a first rotational direction 348 about the shaft axis of shaft 334 to lift article 5 from surface 361. Referring to FIGS. 16B and 16C, as shaft 334 rotates further in first rotational direction 348, cable linkage 370 may be operable to rotate end effectors 360 in a second rotational direction 349 to maintain the engagement orientation of end effectors 360 while lifting article 5 so that an orientation of article 5 is maintained. For example, cable linkage 370 may simultaneously rotate end effectors 360 in second rotational direction 349 to keep article 5 in a horizontal alignment relative to surface 361, thereby preventing the contents of article 5 from spilling while being lifted. For example, second rotational direction 349 may be parallel to first rotational direction 348 but in an opposite direction. When moving article 5, end effectors 360 may be actively rotated by cable linkage 370 in either direction 348 or 349 to maintain any alignment of article 5, such as the horizontal alignment shown in FIGS. 16A-C, or any other alignment relative to datum structure 362 or surface 361.

Figure 17A:
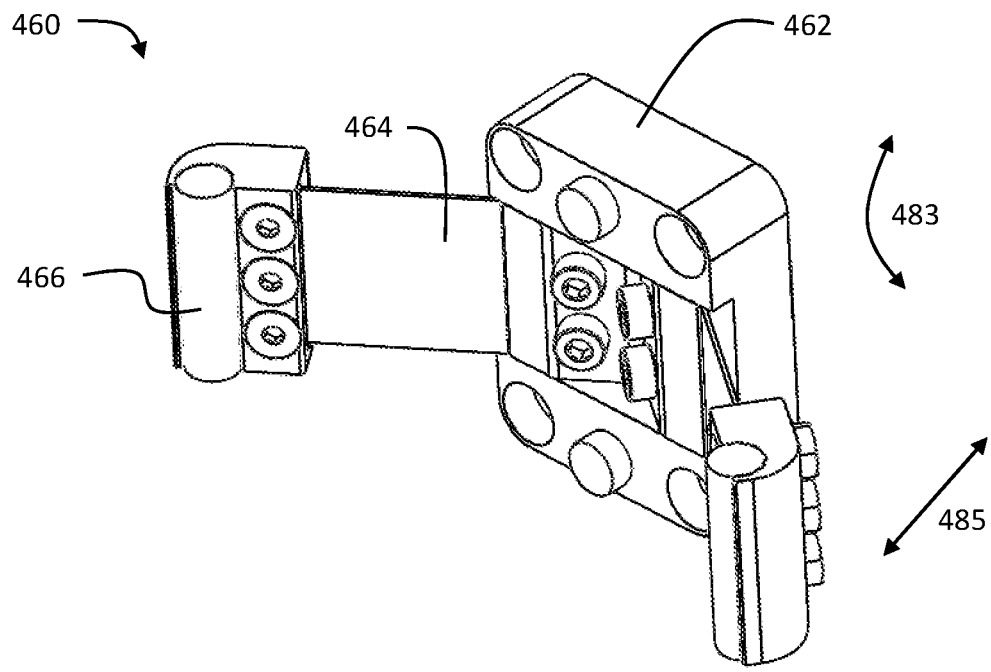
FIG. 17A is a perspective view of an exemplary end effector of the manipulator apparatus of FIG. 13 prior to engaging the article.
Figure 17B:
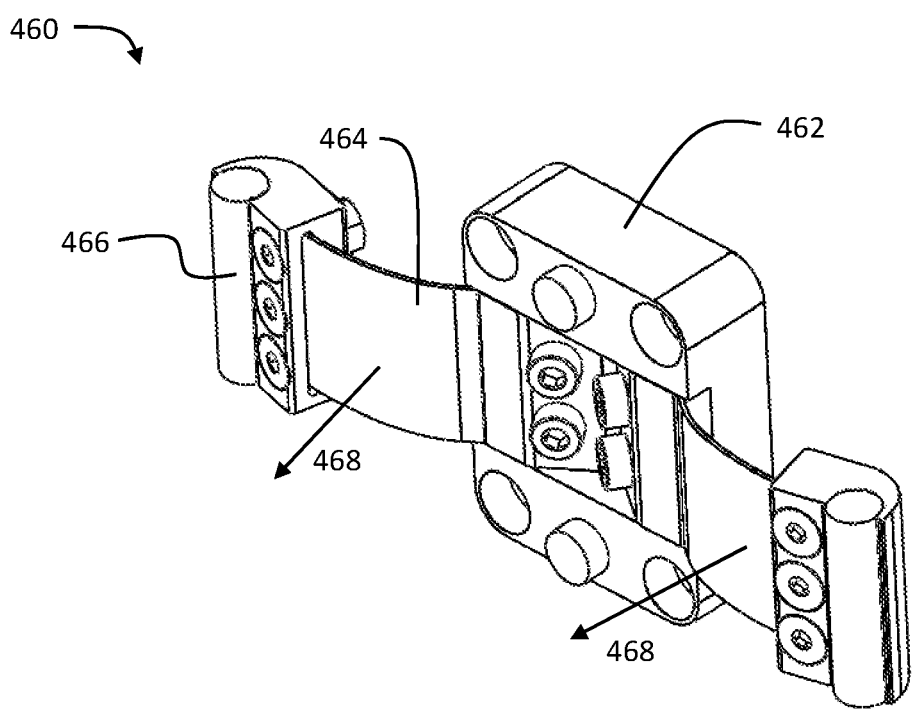
FIG. 17B is a perspective view of the end effector of the manipulator apparatus of FIG. 13 after engaging the article.

An exemplary end effector 460 is now described with reference to FIGS. 17A and 17B. Aspects of end effector 460 may be used interchangeably with any of end effectors 160, 260, and 360, each combination or iteration being part of this disclosure. Referring to FIGS. 17A-B, end effector 460 may comprise: an attachment structure 462, a pair of resilient flexible portions 464, and a pair holding structures 466 engageable with article 5. Attachment structures 462 may connect resilient flexible portions 464 to end effector 460 (e.g., similar to end effector 360 of FIG. 14). Resilient flexible portions 464 may be disposed between attachment structure 462 and holding structures 466. For example, each portion 464 may comprise a resilient flexible material (e.g., such as spring steel). As shown in FIG. 17A, each resilient flexible portion 464 may be biased towards a neutral position. As shown in FIG. 17B, when end effectors 460 engage article 5, each pair of resilient flexible portions 464 may be deflected apart, causing a resilient maintaining force 468 to be exerted against article 5 by holding structures 466. Maintaining force 468, combined with frictional forces between article 5 and structures 466, may help end effectors 460 engage article 5.

Resilient flexible portions 464 may allow end effectors 460 to engage an increased range of dimensions for article 5. For example, each resilient flexible portion 464 may conform to any exterior shape of article 5, including regular shapes (e.g., circular, like a plant pot) or irregular shapes (e.g., jagged, like a landscaping rock). Furthermore, resilient flexible portions 464 also may allow end effector 460 to engage a wider range of articles 5 by increasing the range of predetermined distances 460D at which end effectors 460 may be used to engage article 5. In other words, because of resilient flexible portions 464, a wider range of predetermined distances 460D may be used to grasp article 5 than would otherwise be possible without resilient maintaining force 468. For example, this wider range may be particularly advantageous when predetermined distance 460D is not calibrated properly because the enhanced grasping capabilities of end effector 460 may still allow article 5 to be grasped.

As shown in FIGS. 17A and 17B, manipulator 420 (e.g., similar to manipulator 320 of FIG. 13) may comprise a sensor operable to monitor resilient flexible portions 464. For example, this sensor may comprise a flex sensor or strain gauge sensor that is disposed on portion 464 and operable to provide deflection feedback by determining an amount of deflection for one or both resilient flexible portions 464 relative to the neutral position. In some aspects, manipulator 420 may be configured to established and/or modify predetermined distance 460D (e.g., similar to predetermined distance 360D of FIG. 14) based on the deflection feedback. For example, the sensor may output the deflection feedback whenever end effector 460 comes into contact with article 5; and a controller for manipulator 420 (e.g., controller 13) may utilize the feedback to perform closed-loop grasping, to calibrate arm encoder 429 (e.g., similar to sensor 329 of FIG. 15), and to modify predetermined distance 460D.

Figure 18A:
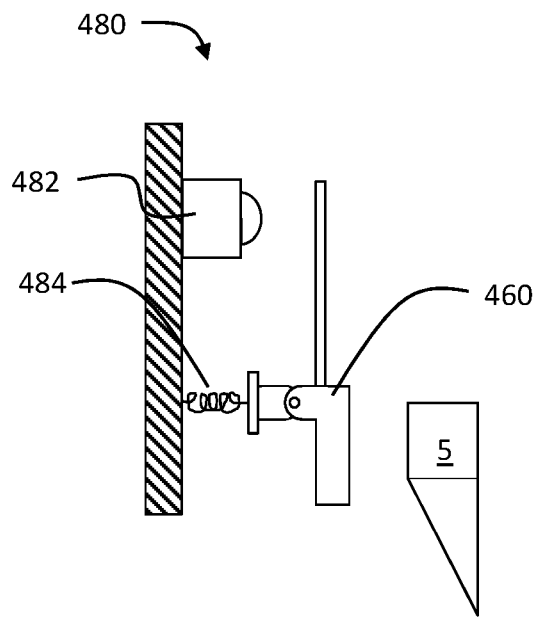
FIG. 18A is a side view of an exemplary sensor operable with an end effector.
Figure 18B:
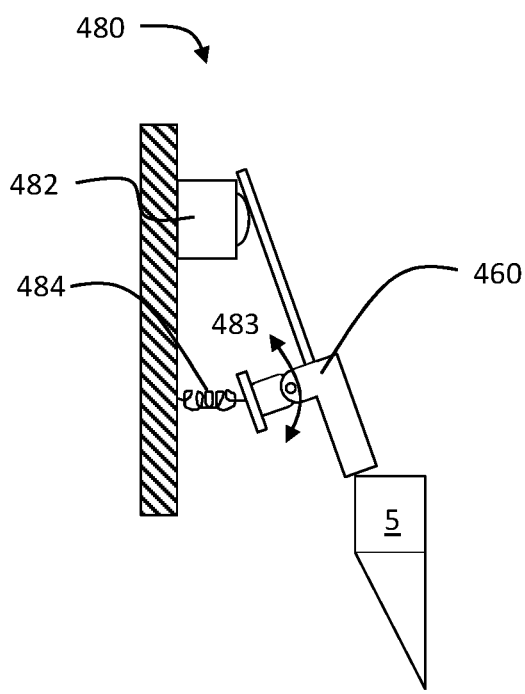
FIG. 18B is a side view of the FIG. 18A sensor and end effector.
Figure 18C:
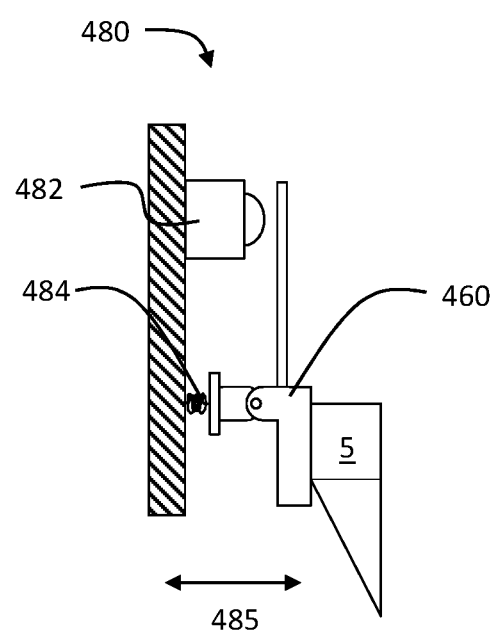
FIG. 18C is another side view of the FIG. 18A sensor and end effector.

As shown in FIGS. 18A, 18B, and 18C, end effector 460 also may comprise one or more error-checking sensors 480, including a vertical tilting error sensor 482 and/or a lateral tilting error sensor 484. For example, each end effector 460 may be movable relative to one of working ends 340W (e.g., FIG. 14) in a vertical tilting direction 483 and a lateral tilting direction 485. In this example, sensor 482 may be activated based on movements of end effector 460 in direction 483, and sensor 484 may be activated based on movements of end effector 460 in direction 485.

End effector 460 may be moved in vertical tilting direction 483 when end effector 460 strikes a top portion of article 5 while being aligned therewith (e.g., similar to FIG. 6A), rather than engaging a side portion of article 5 (e.g., as in FIG. 6B). In this regard, vertical tilting error sensor 482 may be operable to error-check a first alignment of end effector 460 with article 5 so as to prevent article 5 from being inadvertently knocked over. End effector 460 may be moved in lateral tilting direction 485 when one of end effectors 460 fails to engage article 5, such as when one of end effectors 460 is not properly aligned with article 5. In this regard, lateral tilting error sensor 484 may be operable to error-check a second alignment of end effector 460 with article 5 so as to prevent article 5 from being unsuccessfully lifted and potentially knocked over in the process. Both sensors 482 and 484 may be activated when end effectors 460 have successfully engaged article 5. In this regard, sensors 482 and 484 also may be operable to verify that article 5 is ready to be picked up by end effectors 460 (e.g., as in FIG. 6B).

Accordingly, one or more error-checking sensors 480 may be operable between three different states, including: an unactivated state (e.g., FIG. 18A); a vertically activated state (e.g., FIG. 18B); and a laterally activated state (e.g., FIG. 18C). In some aspects, sensor 480 may be operable with a controller (e.g., such as control unit 13 of FIG. 13) to perform additional error-checking functions. For example, sensors 480 may be operable with the controller to perform an error checking method comprising: (i) tracking the state each sensor 480, such as sensors 482 and 484; and (ii) determining whether an error has occurred by comparing the state of the switch with the current state of operations for end effectors 460. The controller also may be operable to generate drive commands responsive to one or more error-checking sensors 480. For example, responsive one or both of sensors 482 and 484, the controller may be operable to generate drive commands causing correction movements of one or both of arms 340. Any output from any sensor described herein may be utilized within this error checking method. For example, sensors 480 also may comprise a tactile switch (or FSR) operable to perform a similar function as the sensor operable to monitor resilient flexible portions 464, allowing it to perform additional error-checking functions with respect to the resilient maintaining force 468 exerted against article 5 by holding structures 466.

It should be appreciated that aspects of method 1000, such as moving step 1040, locating step 1050, and disengaging step 1060, also may be modified to accommodation variations of manipulator 420 without departing from this disclosure. For example, each of steps 1040, 1050, and 1060 may be modified to accommodate aspects of cable linkage 370 and/or end effector 460. As a further example, method 1000 may comprise additional steps associated with the error-checking method.

While specific embodiments have been described and illustrated, such embodiments should be considered illustrative only and not as limiting the disclosed embodiments as construed in accordance with the accompanying claims.

We claim:

1. A manipulator apparatus for manipulating an article comprising:
   an arm comprising a connecting end and a working end;
   an arm actuator coupled with the connecting end by an arm linkage;
   a lift actuator coupled with the connecting end;
   an end effector coupled with the working end by a rotatable connection, the end effector having an engagement orientation relative to the working end; and
   at least one cable coupled between the connecting end of the arm and the rotatable connection;
   wherein:
      the arm actuator is operable to cause the arm linkage to move the working end until the end effector engages the article in the engagement orientation;
      the lift actuator is operable to cause the connecting end to lift the working end, the end effector, and the article; and
      the at least one cable is coupled to transmit movement of the connecting end to the rotatable connection to maintain the engagement orientation of the end effector while lifting such that an orientation of the article is maintained when being lifted.

2. The apparatus of claim 1, further comprising:
   a rearward anchor approximate to the connecting end; and
   a forward anchor approximate to the working end,
   wherein the at least one cable is engaged with the rearward and forward anchors so that a rotation of the rearward anchor causes an opposite rotation of the forward anchor.

3. The apparatus of claim 2, wherein
   the at least one cable is enclosed within a housing that guides the at least one cable between the forward and rearward anchors; and
   the at least one cable moves relative to the housing to transfer forces between the rearward and forward anchors.

4. The apparatus of claim 2, wherein the at least one cable comprises a rearward cable that rotates the rearward anchor and a forward cable that rotates the forward anchor.

5. The apparatus of claim 1, wherein:
   the end effector comprises opposing end effector segments; and
   the opposing end effector segments are operable to engage the article.

6. The apparatus of claim 5, wherein the opposing end effector segments are deflected apart from one another by the article when engaging the article in the engagement orientation.

7. The apparatus of claim 6, wherein the opposing end effector segments exert a resilient retaining force to the article after being deflected apart.

8. The apparatus of claim 1, wherein the arm linkage comprises a linear actuator operable to cause the working end to move relative to the connecting end.

9. The apparatus of claim 1, wherein:
   the arm is a first arm;
   the apparatus comprises:
      a second arm including a second connecting end and a second working end; and
      a second end effector coupled with the second working end by a second rotatable connection; and the arm linkage maintains a parallel alignment of the working end with the second working end while moving the working to engage the article from.

10. The apparatus of claim 9 wherein,
the articles comprises a plant container; and
the end effector of the arm and the second end effector of the second arm are operably configured to engage the plant container from opposing sides.

11. The apparatus of claim 9, wherein the arm linkage comprises a parallelogram linkage that maintains the parallel alignment of the working end with the second working end.

12. The apparatus of claim 9, wherein the end effector is linearly movable relative to the working end in a direction towards the second working end.

13. The apparatus of claim 1 wherein the end effector comprises at least one motion operated sensor disposed to generate an engagement signal indicative of a state of engagement of the end effector.

14. The apparatus of claim 13 further comprising a controller operably configured to monitor the engagement signal and to produce an error signal when one of:

the engagement signal indicates that the end effector is in the state of engagement prior to engaging or lifting the article;
the engagement signal indicates that the end effector is not in the state of engagement while lifting the article; or
the engagement signal changes state from indicating that the end effector is in the state of engagement to not being in the state of engagement while lifting the article.

15. The apparatus of claim 13 wherein the at least one motion operated sensor comprises one of a limit switch, a proximity detector, a force sensor, or a strain gauge.

16. The apparatus of claim 13 wherein the engagement signal produced by the at least one motion operated sensor comprises one of:

a signal having a first state indicative of the end effector being in the state of engagement and a second state indicative of the end effector not being in the state of engagement; or
a signal having a plurality of values indicative of a degree of engagement of the end effector.

* * * * *

UNITED STATES PATENT AND TRADEMARK OFFICE
CERTIFICATE OF CORRECTION

PATENT NO. : 10,745,219 B2  
APPLICATION NO. : 16/510795  
DATED : August 18, 2020  
INVENTOR(S) : Farhang Bidram et al.

Page 1 of 1

It is certified that error appears in the above-identified patent and that said Letters Patent is hereby corrected as shown below:

In the Claims

Column 16, Lines 15 to 16, Claim 1 delete:
"at least one cable coupled between the connecting end of the arm and the rotatable connection;"

And insert:
--at least one cable coupled between the connecting end and the rotatable connection;--

Column 17, Lines 2 to 3, Claim 9 delete:
"....while moving the working to engage the article from."

And insert:
--while moving the working end to engage the article.--

Column 17, Line 5, Claim 10 delete:
"the articles comprises a plant container; and"

And insert:
--the article comprises a plant container; and--

Signed and Sealed this  
Twentieth Day of April, 2021

Drew Hirshfeld  
*Performing the Functions and Duties of the  
Under Secretary of Commerce for Intellectual Property and  
Director of the United States Patent and Trademark Office*